(12) United States Patent
Colombo et al.

(10) Patent No.: US 11,035,972 B2
(45) Date of Patent: Jun. 15, 2021

(54) SYSTEMS AND METHODS FOR ELECTROMAGNETIC WATERFRONT SURVEILLANCE IN A VICINITY OF AN OIL WELL

(71) Applicant: Saudi Arabian Oil Company, Dhahran (SA)

(72) Inventors: Daniele Colombo, Dhahran (SA); Gary W. McNeice, Dhahran (SA); Ernesto Sandoval-Curiel, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 58 days.

(21) Appl. No.: 16/410,804

(22) Filed: May 13, 2019

(65) Prior Publication Data
US 2020/0363554 A1 Nov. 19, 2020

(51) Int. Cl.
*G01V 3/08* (2006.01)
*G01V 3/12* (2006.01)
*G01V 3/26* (2006.01)

(52) U.S. Cl.
CPC .............. *G01V 3/083* (2013.01); *G01V 3/088* (2013.01); *G01V 3/12* (2013.01); *G01V 3/26* (2013.01)

(58) Field of Classification Search
CPC .......... G01V 3/083; G01V 3/088; G01V 3/12; G01V 3/26
See application file for complete search history.

(56) References Cited

U.S. PATENT DOCUMENTS

| 4,349,781 A | 9/1982 | Vozoff |
| 6,393,363 B1 | 5/2002 | Wilt et al. |

(Continued)

FOREIGN PATENT DOCUMENTS

| CN | 102667530 | 9/2012 |
| GB | 2410090 | 7/2005 |
| WO | 2005085909 | 9/2005 |

OTHER PUBLICATIONS

International Search Report and Written Opinion issued in International Application No. PCT/US2018/032030 dated Aug. 2, 2018, 16 pages.

(Continued)

*Primary Examiner* — Tung X Nguyen
*Assistant Examiner* — Feba Pothen
(74) *Attorney, Agent, or Firm* — Fish & Richardson P.C.

(57) ABSTRACT

Systems, methods, and devices for performing real-time detecting and spatially-positioning a waterfront in an oil-producing reservoirs are disclosed. An example method of predicting movement of a waterfront in a reservoir may include generating a plurality of electrical signals having different frequencies with a surface electric source; injecting currents corresponding to the plurality of generated signals into the earth near a well extending into the reservoir with a surface dipole; sensing a vertical component of an electric field generated by each of the injected currents at a location in the reservoir with a sensor; detecting a location of the waterfront within the reservoir based on the received vertical components of the electric fields; and analyzing the detected vertical components of the electric fields taken on at least two different points in time with machine learning to predict a rate of movement of the waterfront within the reservoir.

19 Claims, 16 Drawing Sheets

(56) References Cited

U.S. PATENT DOCUMENTS

| | | | |
|---|---|---|---|
| 6,426,917 | B1 | 7/2002 | Tabanou et al. |
| 6,739,165 | B1 | 5/2004 | Strack |
| 7,599,803 | B2 | 10/2009 | Scott |
| 7,675,813 | B2 | 3/2010 | Valero et al. |
| 8,106,791 | B2 | 1/2012 | Thompson et al. |
| 8,390,471 | B2 | 3/2013 | Coates et al. |
| 8,392,119 | B2 | 3/2013 | Alumbaugh et al. |
| 8,638,103 | B2 | 1/2014 | Rosthal et al. |
| 8,680,866 | B2 | 3/2014 | Marsala et al. |
| 8,816,689 | B2 | 8/2014 | Colombo et al. |
| 8,901,931 | B2 | 12/2014 | Esmersoy |
| 8,947,093 | B2 | 2/2015 | Alumbaugh et al. |
| 9,739,905 | B2 | 8/2017 | Sena |
| 10,067,255 | B2 | 9/2018 | Colombo et al. |
| 2002/0016675 | A1* | 2/2002 | Vail, III ................ G01V 11/00 702/2 |
| 2004/0160223 | A1 | 8/2004 | McElhinney |
| 2007/0075890 | A1 | 4/2007 | Jackson |
| 2007/0239402 | A1 | 10/2007 | Scott |
| 2008/0262735 | A1* | 10/2008 | Thigpen ................ E21B 47/10 702/6 |
| 2009/0039889 | A1 | 2/2009 | Wilt et al. |
| 2010/0259268 | A1 | 10/2010 | Zhang et al. |
| 2011/0001482 | A1 | 1/2011 | Alumbaugh et al. |
| 2011/0036569 | A1 | 2/2011 | Bass et al. |
| 2011/0308789 | A1 | 12/2011 | Zhang et al. |
| 2012/0191353 | A1 | 7/2012 | Wilt et al. |
| 2012/0293179 | A1 | 11/2012 | Colombo et al. |
| 2013/0300419 | A1 | 11/2013 | Hibbs |
| 2015/0061684 | A1 | 3/2015 | Marsala et al. |
| 2015/0101817 | A1 | 4/2015 | White et al. |
| 2015/0369949 | A1 | 12/2015 | Cuevas et al. |
| 2015/0378044 | A1 | 12/2015 | Brooks |
| 2017/0097441 | A1 | 4/2017 | Eiskamp |
| 2017/0146681 | A1 | 5/2017 | Cuevas et al. |
| 2017/0284190 | A1* | 10/2017 | Dashevsky ............ E21B 49/08 |
| 2018/0283168 | A1* | 10/2018 | Ranjan .................. E21B 47/00 |
| 2020/0319365 | A1 | 10/2020 | Colombo et al. |

OTHER PUBLICATIONS

Aziz et al., "Surface-to-borehole TEM for reservoir monitoring," SEG-2011-1882, Society of Exploration Geophysicists, 2011 SEG Annual Meeting, Texas, Sep. 18-23, 2011, 5 pages.

Azizuddin et al., "Surface-to-borehole TEM for Reservoir Monitoring," SEG San Antonio 2011 Annual Meeting, 5 pages.

Colombo and McNeice, "Geophysical monitoring of waterflooding in Saudi Arabia: Methods and perspectives," SEG Annual Meeting Expanded Abstracts, SEG International Exposition and 87th Annual Meeting, Sep. 2017, 5 pages.

Colombo and McNeice, "Quantifying surface-to-reservoir electromagnetics for waterflood monitoring in a Saudi Arabian carbonate reservoir," Geophysics vol. 78, No. 6, Nov.-Dec. 2013, 17 pages.

Colombo and McNeice, "Surface to borehole CSEM for waterflood monitoring in a supergiant oilfield in Saudi Arabia: data analysis," 2018, 5 pages.

Colombo and Rovetta, "Geophysical joint inversion with multiple coupling operators," 88th Annual international Meeting, SEG Expanded Abstracts, 2018, 5 pages.

Colombo et al., "Feasibility study of surface-to-borehole CSEM for oil-water fluid subsition in Ghawar Field," KMS Technologies—KJT Enterprises, Inc., Saudi Arabia, Geo 2010, poster, 4 pages.

Dogru et al., "A next-generation parallel reservoir simulator for giant reservoirs," SPE Journal Paper 119272, presented at the Reservoir Simulation Symposium in the Woodlands, Texas, Feb. 2009, 29 pages.

McNeice and Colombo, "3D inversion of surface to borehole CSEM for waterflood monitoring," 2018, 4 pages.

Wilt et al., "Cross-borehole electromagnetic induction for reservoir characterization," SPE-23623-MS, 61st Annual International Meeting, SEG Expanded Abstracts, Mar. 8-11, 1991, 4 pages.

Wilt et al., "Crosswell electromagnetic tomography: System design consideration and field results," Geophysics, vol. 60, May 1995, 15 pages.

Colombo et al, "Application of pattern recognition techniques to long-term earthquake prediction in central Costa Rica," Engineering Geology 48 (1997), pp. 7-18.

Sabbione et al, "Automatic first-breaks picking: New strategies and algorithms," Geophysics, 75(4), pp. 67-76, Jul. 2009.

Schmidhuber et al, "Deep learning in neural networks: An overview: Neural Networks," Elsevier, Neural Networks, vol. 61, Jan. 2015, pp. 85-117.

Colombo et al., "Surface to borehole electromagnetics for 3D waterflood monitoring: results from first field deployment," SPE Annual Technical Conference and Exhibition, Jan. 2018, 15 pages.

Ho et al., "3-D Inversion of borehole-to-surface electrical data using a back-propagation neural network," Journal of Applied Geophysics, Aug. 2009, 68(4):489-499.

Liang et al., "Joint inversion of controlled-source electromagnetic and production data for reservoir monitoring," Geophysics, Society of Exploration Geophysicists, Sep. 2012, 77(5):9-22.

PCT International Search Report and Written Opinion in International Appln. No. PCT/US2020/032587, dated Sep. 1, 2020, 15 pages.

GCC Examination Report in GCC Application No. GC 2018-35278 dated Aug. 20, 2020, 4 pages.

CN Office Action in Chinese Application No. 201880044535.5 dated Dec. 10, 2020, 5 pages. (With Partial English Translation).

* cited by examiner

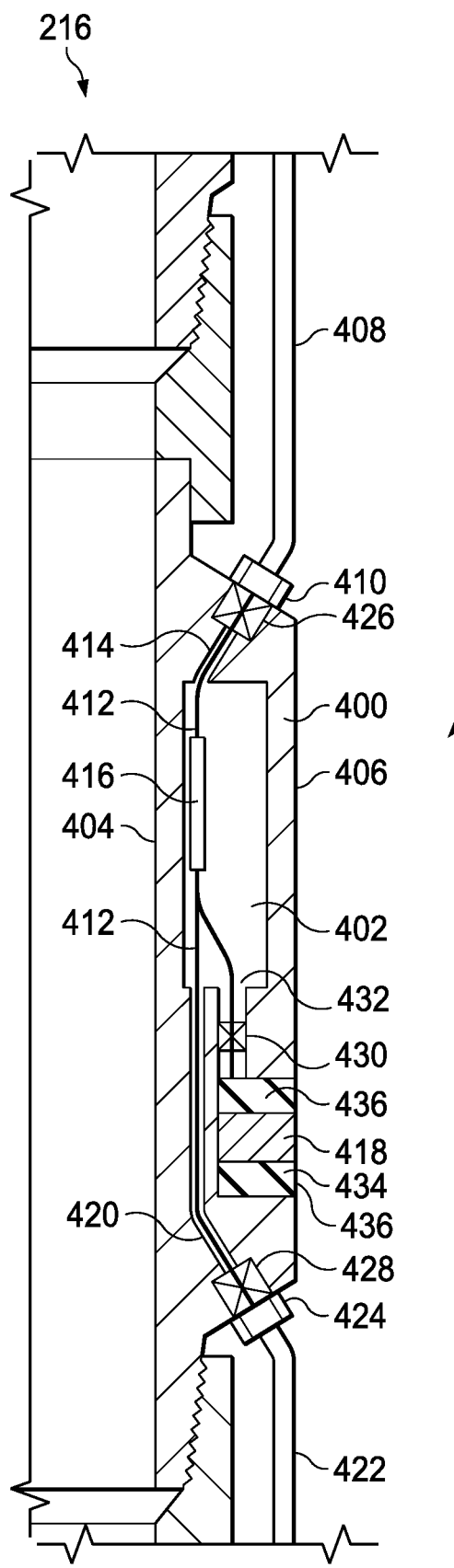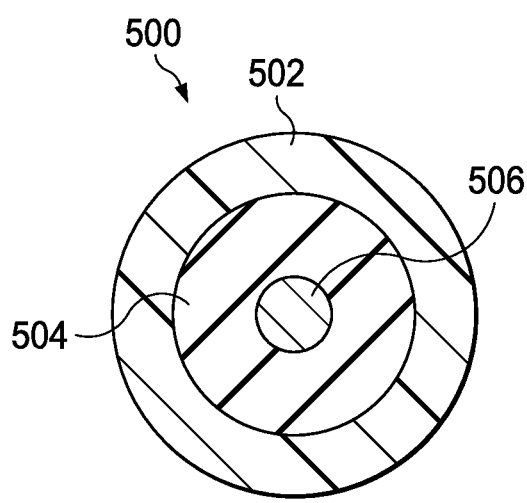
FIG. 4
FIG. 5

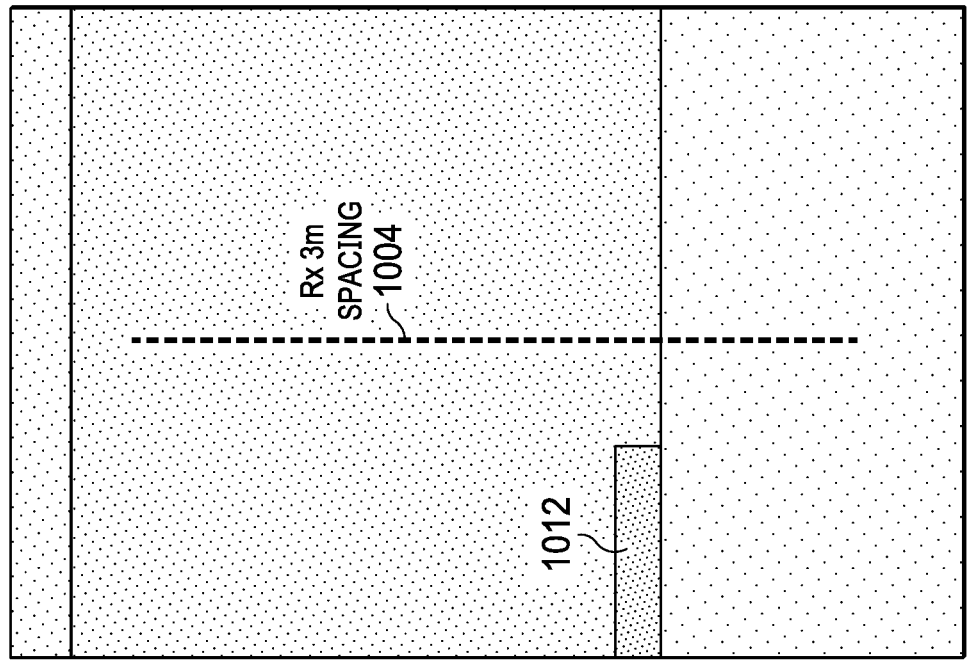
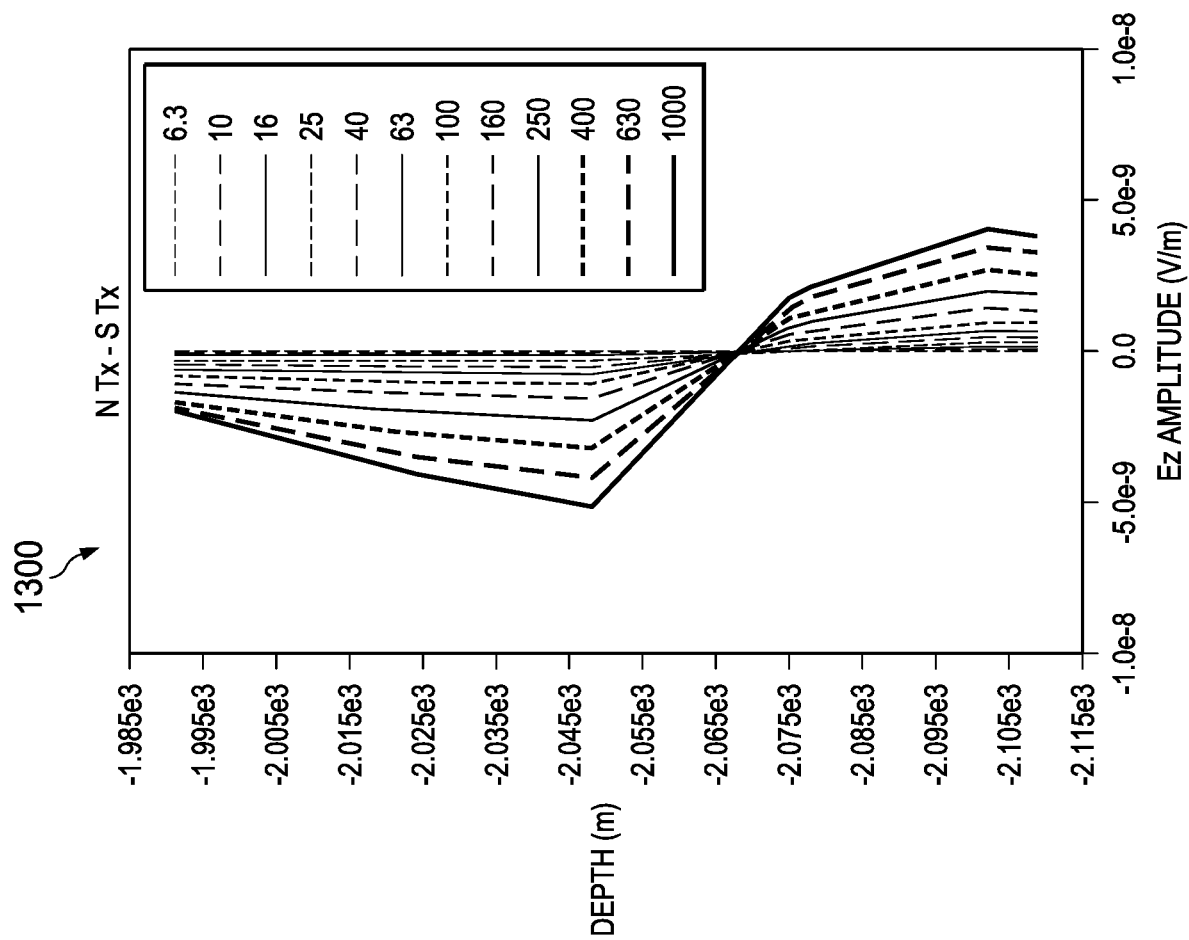
FIG. 13

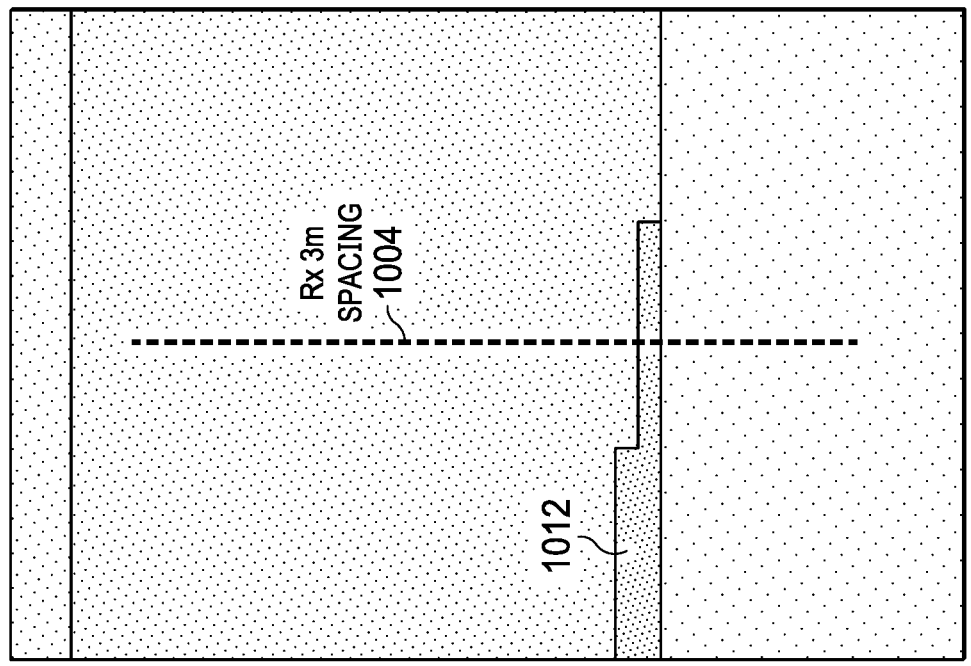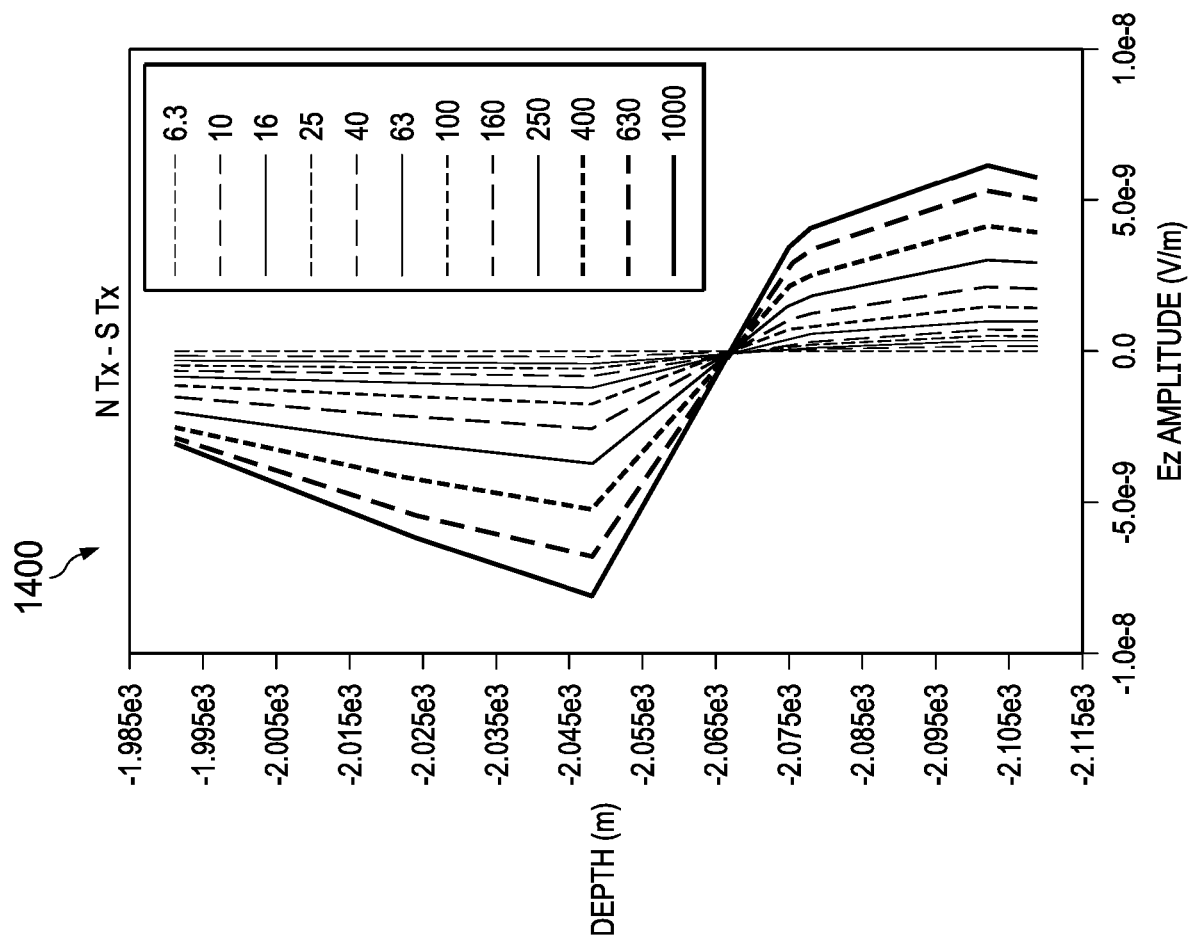
FIG. 14

SYSTEMS AND METHODS FOR ELECTROMAGNETIC WATERFRONT SURVEILLANCE IN A VICINITY OF AN OIL WELL

TECHNICAL FIELD

The present disclosure is directed to systems and methods for enhanced hydrocarbon recovery from a reservoir.

BACKGROUND

Waterflooding is a secondary recovery method often utilized to enhance production of oil from an oil-bearing reservoir. Waterflooding relies on injection of water at a periphery of the oil-bearing reservoir to maintain pressure on the reservoir and, hence, maintain a satisfactory level of production of a well extending into the reservoir. Reservoir modeling based on computer simulations is typically used to predict the propagation of the waterfront for managing oil production from a well. Electromagnetic (EM) methods are sensitive to oil-versus-water properties as the bulk formation resistivity can change by more than a factor of ten between oil saturated rocks and water saturated rocks.

The manner in which water injected during waterflooding propagates inside the reservoir is related to the permeability of the reservoir and the surrounding formations, which is, in many cases, controlled by fractures. Fractures may be naturally occurring or generated through a hydraulic fracturing treatment. Fracture patterns create permeable zones that cannot be predicted by simulators, and often the injected water arrives at the well before it is expected. The unexpected arrival of water at the well is referred to as a water breakthrough. Water breakthroughs into producing wells can cause disruptions to production, sometime severe disruptions, and, in some cases, can ultimately cause premature abandonment of the well or of multiple wells.

SUMMARY

A first aspect of the present disclosure is directed to a method of predicting movement of a waterfront within a reservoir during a waterflooding of the reservoir. The method may include generating a plurality of electrical signals with a surface electric source, each of the signals having a different corresponding frequency; injecting currents corresponding to the plurality of generated signals into the earth within a predefined distance from a well extending into the reservoir with a surface dipole; detecting vertical components of electric fields generated by the injected currents at locations in the reservoir, the vertical components of the electric fields corresponding to bulk formation resistivity changes present in the reservoir that represent the waterfront; detecting a location of the waterfront within the reservoir based on the received vertical components of the electric fields; and analyzing the detected vertical components of the electric fields taken on at least two different points in time using machine learning to predict a rate of movement of the waterfront within the reservoir.

Another aspect of the present disclosure is directed to a real-time monitoring system to detect and spatially-position a waterfront in a reservoir. The system may include a surface-to-borehole electromagnetic ("SBEM") acquisition system comprising a plurality of electric dipoles formed on the surface. The SBEM acquisition system may be operable to inject currents having different frequencies into the earth and measure the resulting vertical electrical fields associated with the different frequency currents. The system may also include a data processing system operable to process the received measured vertical electric fields to enhance a signal-to-noise ratio of the measured vertical electric fields; a machine learning data analysis system operable to detect patterns within the measured vertical electric fields and predict movement of the waterfront within the reservoir; and an alarm and control system operable to signal an alarm when a position of the waterfront is predicted to be a predetermined distance from the well.

Another aspect of the present disclosure is directed to a computer program product encoded on a non-transitory medium, the product including computer readable instructions for causing one or more processors to perform operations. The operations may include generating a plurality of electrical signals with a surface electrical source, each of the signals having a different corresponding frequency; injecting currents corresponding to the plurality of generated signals into the earth within a predefined distance from a well extending into the reservoir with a surface dipole; detecting vertical components of electric fields generated by the injected currents at locations in the reservoir, the vertical components of the electric fields corresponding to bulk formation resistivity changes present in the reservoir that represent the waterfront; detecting a location of the waterfront within the reservoir based on the received vertical components of the electric fields; and analyzing the detected vertical components of the electric fields taken on at least two different points in time using machine learning to predict a rate of movement of the waterfront within the reservoir.

The various aspects may include one or more of the following features. Injecting currents corresponding to the plurality of generated signals into the earth near a well extending into the reservoir with a surface dipole may include injecting currents into the earth with a plurality of dipoles forming a surface-to-borehole acquisition system. The machine learning may include a deep learning system. Deep learning is also known as deep structured learning or hierarchical learning and is based on neural network methods including convolutional neural networks. Analyzing the detected vertical components of the electric fields taken on at least two different points in time with machine learning to predict a rate of movement of the waterfront within the reservoir may include generating a separate reservoir model for each point in time with a reservoir simulator; converting the separate reservoir models into respective resistivity models; generating simulated electromagnetic (EM) responses to a simulated waterfront contained within the resistivity models through EM data modeling; forming EM data hypercubes with the simulated EM responses for each point in time; and applying the deep learning system to the separate resistivity models and the EM data hypercubes, which form a machine learning knowledge-base or training dataset. Applying the deep learning system to the separate reservoir models and the EM data hypercubes may include performing a series of regressions between the reservoir models and EM data hypercubes to predict the rate of movement of the waterfront within the reservoir. The simulated EM responses may be arranged in the EM data hypercube based on a position of the waterfront relative to the well, the frequency of the corresponding generated electrical signal, a position of a sensor that detects the vertical components of the electric fields in the reservoir, and a radial offset of a shallow surface electrode forming an electrode of the surface dipole. Injecting currents corresponding to the plurality of generated signals into the earth near a well extending into the reservoir with a surface dipole may include injecting currents having a frequency in the range of 1 hertz (Hz) to 1000 Hz. A dipole moment of the surface dipole may be approximately 20,000 (Ampere-meter) A·m.

The various aspects may also include one or more of the following features. The SBEM acquisition system may include a plurality of radials, wherein each radial comprises a plurality of shallow borehole electrodes spaced apart along the radial and wherein each of the shallow borehole electrodes forms a first dipole electrode; a well casing forming a second dipole electrode; and a surface electric source associated with each of the plurality of radials, each of the surface electric sources operable to generate the electrical signals to create the currents having different frequencies. Each surface electric source may be coupled to the well casing and may be selectively coupled to one of the shallow borehole electrodes disposed along the radial associated with the surface electric source. The SBEM acquisition system further may include a plurality of sensors disposed along a length of the well extending through the reservoir, each of the plurality of sensors operable to detect a vertical electric field corresponding to the injected currents. The machine learning data analysis system operable to detect patterns within the measured vertical electric fields and predict movement of the waterfront within the reservoir may include a deep learning system operable to receive the measured vertical electric field measurements taken at different points in time and a reservoir model for each point in time. The vertical electric field measurements may be arranged in an EM data hypercube for a point in time. The machine learning data analysis system may be operable to predict movement of the waterfront in the reservoir based on predicted patterns using regressions between the reservoir models and the EM data hypercubes. The SBEM acquisition system may be operable to inject currents having frequencies within a range of 1 Hz to 1,000 Hz. A dipole moment of the plurality of electric dipole is approximately 20,000 A·m.

The details of one or more embodiments of the present disclosure are set forth in the accompanying drawings and the description that follows. Other features, objects, and advantages of the present disclosure will be apparent from the description and drawings, and from the claims.

DESCRIPTION OF DRAWINGS

FIG. 4 is a cross-sectional view of a downhole tool with an electromagnetic sensor, according to some implementations of the present disclosure.

FIG. 5 is a cross-sectional view of an umbilical of the sensor of FIG. 4, according to some implementations of the present disclosure.

FIGS. 12, 13, and 14 are graphs of simulated response variations of modeled vertical electric fields corresponding to a simulated waterfront at different positions from a well, according to some implementations of the present disclosure.

Like reference symbols in the various drawings indicate like elements.

DETAILED DESCRIPTION

Figure 1:
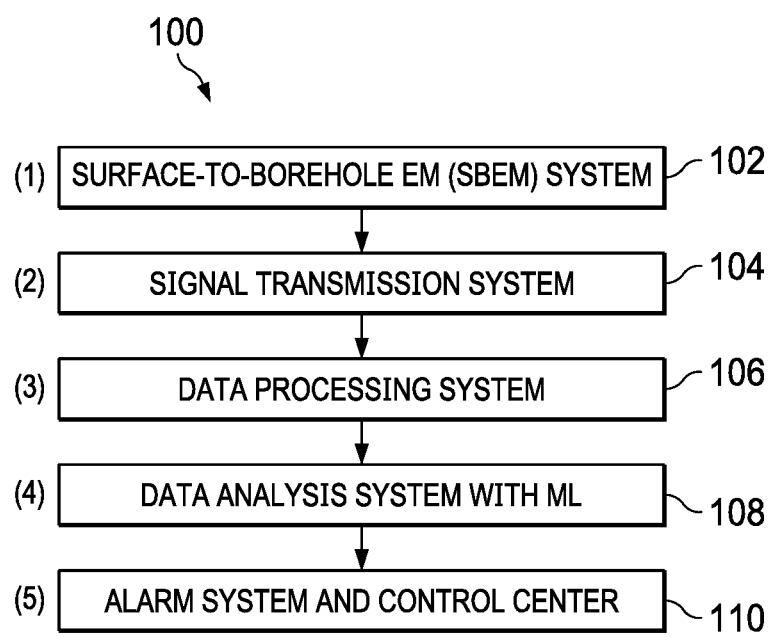
FIG. 1 is a schematic showing an example system for detecting and mapping a waterfront within a reservoir, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, steps, or a combination of any of these described with respect to one implementation may be combined with the features, components, steps, or a combination of any of these described with respect to other implementations of the present disclosure.

The present disclosure is directed to methods and systems for detecting and mapping a waterfront associated with waterflooding of an oil-bearing reservoir. More particularly, the present disclosure is directed to detecting and mapping a waterfront in proximity to a producing well in order to prevent unintentional incursion of the waterfront into the well so as to avoid disruption in production or abandonment of the well.

Careful monitoring of a waterflooding process is important for efficient reservoir management. The present disclosure provides remote sensing techniques that can predict arrival of an approaching waterfront at a well before the arrival and before a water breakthrough occurs. Early detection of an imminent water breakthrough can allow engineers to take measures to attenuate the problem, such as tuning production in a particular well or other wells. To this goal a real-time monitoring system is provided. According to some implementations, electromagnetic (interchangeably referred to as "EM") geophysical methods are used. Electromagnetics are sensitive to oil-versus-water properties, because bulk formation resistivity can change by more than a factor of ten between oil-saturated rocks and water-saturated rocks. Other commonly used methods, such as seismic methods and microgravity methods, are less effective due to the low contrasts in seismic impedance and density.

The methods and systems of the present disclosure provide time-lapsed monitoring of a waterfront by collecting time-lapsed measurements that are utilized to monitor the approach of the waterfront to a well. Further, the detection and monitoring of a waterfront can be accomplished without the use of a laborious and expensive three-dimensional (3D) inversion computation with the use of a machine-learning algorithm, thereby providing quicker results, at increased resolution, and a lower cost. Additionally, mapping, monitoring, or both of a waterfront may be automated. Consequently, in some implementations, the present disclosure provides automated, real-time monitoring systems and methods to detect and spatially position a waterfront in producing oil reservoirs.

The systems and methods of detecting and mapping a waterfront position in a vicinity of a well of the present disclosure include arrangements of electromagnetic (EM) sources, receivers, and data acquisition methods used to acquire data that are used to detect and map the waterfront position. The disclosed systems and methods provide time-lapsed behavior of a waterfront with the use of measurements of a vertical electric field, $E_z$. In some instances, the vertical electric field measurements may be used by an automatic surveillance system to detect a waterfront approaching the well. Vertical electric field measurements are used throughout the remainder of the disclosure. However, the scope of the present disclosure is not intended to be limited to the vertical electric field. Rather, in other implementations, other types of electromagnetic energy may be used to detect and track a waterfront. For example, magnetic fields, such as vertical and horizontal magnetic fields, may be used to detect and track a waterfront.

FIG. 1 shows a schematic of an example real-time monitoring system 100 for detecting and spatially-positioning or mapping a waterfront. A surface-to-borehole EM ("SBEM") acquisition system 102 acquires data used to detect and monitor a waterfront within a reservoir. The SBEM acquisition system 102 includes a plurality of surface dipoles, surface electric sources, and downhole sensors or receivers. The surface electric sources, the surface dipoles, and the downhole sensors combine to form a signal transmission system 104 that is operable to inject currents based on signals having different frequencies and measure the resulting vertical electric fields. Thus, the signal transmission system 104 forms part of the SBEM acquisition system 102. The sensed electric field measurements are converted into resistivity values and modeled to identify a position of a waterfront in a reservoir. The electric field measurements are taken over various points in time to obtain position information of the waterfront within the reservoir. The electric field measurements are processed by a data processing system 106 to enhance the signal-to-noise ratio of the measurements. The electric field measurements taken over time are applied to machine learning to predict movement of the waterfront within the reservoir, such as a rate of movement of the waterfront within the reservoir. The processed electric field measurement data are analyzed with a machine learning system 108. An alarm and control system 110 receives the output of the machine learning system 108 to monitor movement of the waterfront within the reservoir and provide an alarm when the waterfront comes within a specified distance from a well that extends into the reservoir. The real-time monitoring system 100 may be automated.

Figure 2:
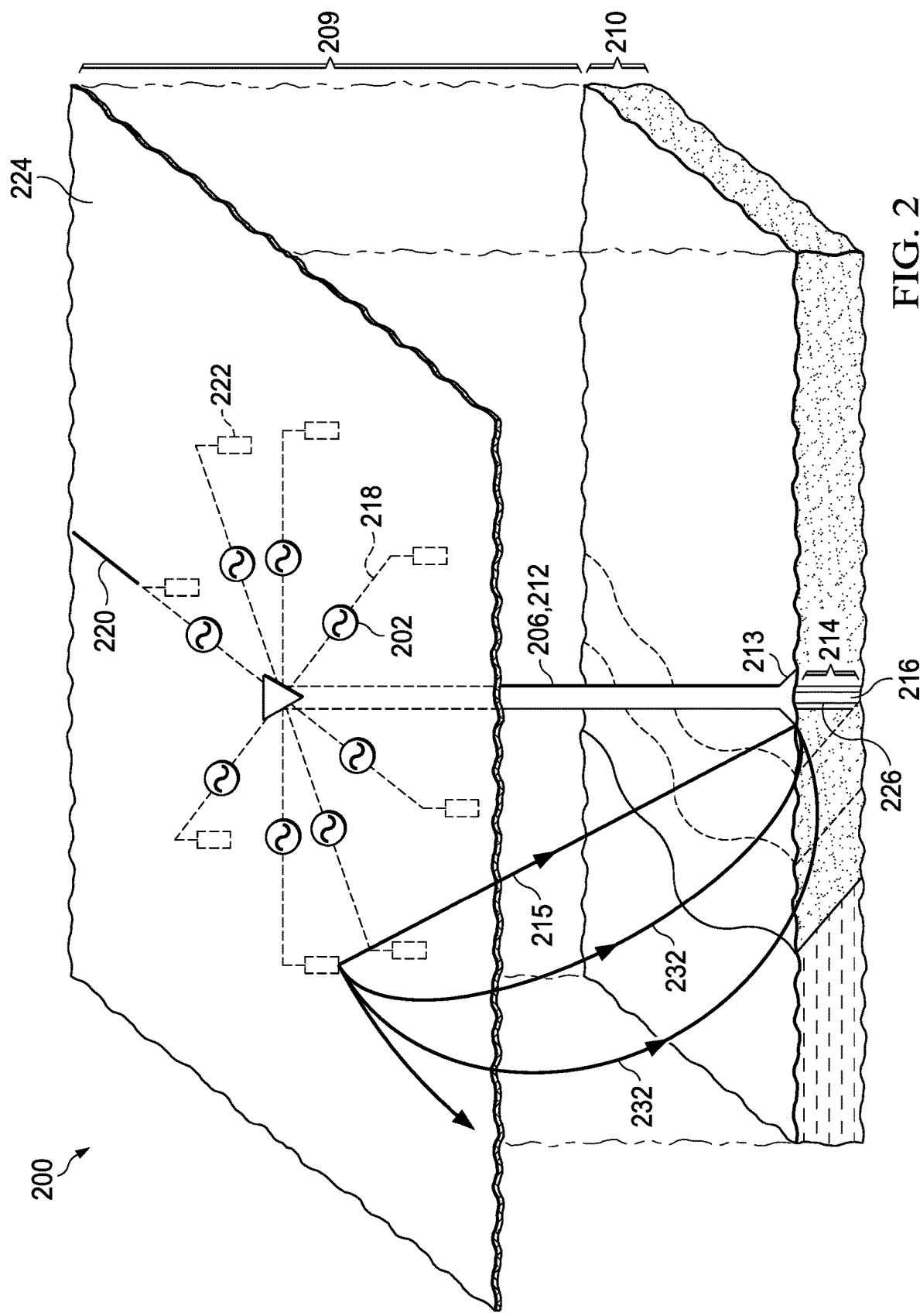
FIG. 2 is a schematic view of an example surface-to-borehole electromagnetic ("SBEM") acquisition system, according to some implementations of the present disclosure.

FIG. 2 shows an example SBEM acquisition system 200. The system 200 includes a plurality of surface electric sources 202. As shown in FIG. 2, the surface electric sources 202 are distributed azimuthally around a well 206. The well 206 extends from a surface 224 of the earth, through formations 209, and to an oil-bearing formation or reservoir 210. A portion of the well 206 is cased with a casing 212, and a portion of the well is uncased, forming an openhole portion 214. The casing 212 terminates at a casing shoe 213. Production tubing 216 extends through the openhole portion 214.

In the illustrated example, the well 206 is vertical. However, the scope of the disclosure is not so limited. In other implementations, the well 206 may be a slanted or horizontal well. As shown, each surface electric source 202 is connected to a plurality of dipoles 218 that are radially arranged along a common radial line 220. In some implementations, the SBEM acquisition system may include eight radial lines 220. The radial lines 220 may be symmetrically arranged about the well 206 and have a uniform angular separation of one radial line 220 to an adjacent radial line 220. In the example of eight radial lines 220, a 45° angle separates adjacent radial lines 220. In other implementations, fewer radial lines 220 may be used. The radial lines of an SBEM acquisition system having fewer than eight radial lines may be symmetrically arranged about the well.

The surface electric sources 202 are connected to the casing 212 of the well 206 at one end and to an azimuthal shallow borehole electrode 222 at the surface 224 at the opposite end. Consequently, each dipole 218 is formed by an azimuthal shallow borehole electrode 222 at one end and a second electrode at an opposite end. The second electrode is formed by the steel casing 212 of the well 206. In some instances, the surface electric sources 202 may be connected to the casing of the well 206 at a surface location. In other instances, the surface electric sources 202 may be coupled to an electrode that is inserted to a desired depth with in the well 206 and coupled, such as by clamping, to an inner surface of the casing 212. If the well 206 is connected at the wellhead as opposed to using an electrode inserted to a depth of the well 206 and coupled, some current may leak along the casing and into surrounding formation. However, such leakage does not pose a problem for time-lapse measurements because such leakage would occur consistently at each measurement taken with an identical leakage pattern. With the use of an electrode coupled to the casing, by moving the electrode closer to the casing shoe, a larger dipole moment is produced, and a location where the current is injected into the earth is closer to the reservoir being monitored. The casing 212 may be formed of a metal, such as steel. In either configuration, the casing 212 of the well 206 acts as a long electrode coupled to the formations 209 and reservoir 210 below the surface 224. Current is injected into the earth between the shallow borehole electrodes 222 and the electrode formed by the casing 212 of the well 206. For a given radial line 220, as a shallow borehole electrode 222 disposed farther away from the well 206 is coupled to the surface electric source 202, thereby forming a larger dipole 218 in comparison to a shallow borehole electrode 222 located closer to the well 206, the electric current injected into the earth between the shallow borehole electrode 222 and the electrode formed by the casing 212 occurs a larger distance away from the well 206. In this way, a length of an electric dipole 218 formed along a radial line 220 is changeable by altering the shallow borehole electrode 222 to which the surface electric source 202 is coupled.

In some implementations, for a given radial 220, the surface electric source 202 may be selectively connected to the different shallow borehole electrodes 222. With the different shallow borehole electrodes 222 located at different distances from the well 206, changing the shallow borehole electrode 222 to which the surface electric source 202 is connected to another of the shallow borehole electrodes 222 changes the effective length of the dipole. For a given current, a longer dipole increases a dipole moment (where the dipole moment equals the current times the length of the dipole), more energy is transmitted into a formation.

As indicated, each radial line 220 may include a plurality of shallow borehole electrodes 222. In some implementations, each radial line 220 may include five shallow borehole electrodes 222. The shallow borehole electrodes 222 along each radial line 220 may be uniformly arranged. Thus, in some implementations, the shallow borehole electrode 222 directly adjacent to the well 206 is offset from the well 206 by 200 meters (m), and a separation distance between adjacent shallow borehole electrodes 222 is 200 m. Thus, in such implementations, the last of the five shallow borehole electrodes 222 along a radial line 220 is disposed at 1000 m from the well 206.

In other implementations, each radial line 220 may include more than five shallow borehole electrodes 222. The number of shallow borehole electrodes 222 included may vary depending on the depth of the reservoir being investigated. The deeper the reservoir, that is, the farther the reservoir is from the surface, the greater the offset of the shallow borehole electrodes that may be included along each radial line. Further, in some implementations, the spacing between adjacent shallow borehole electrodes may be increased or decreased from the illustrated example of 200 m. Practical considerations in defining the number of shallow borehole electrodes along a radial line and the spacing between adjacent shallow borehole electrodes is the formation resistivity, reservoir depth, and desired area of investigation.

Figure 3:
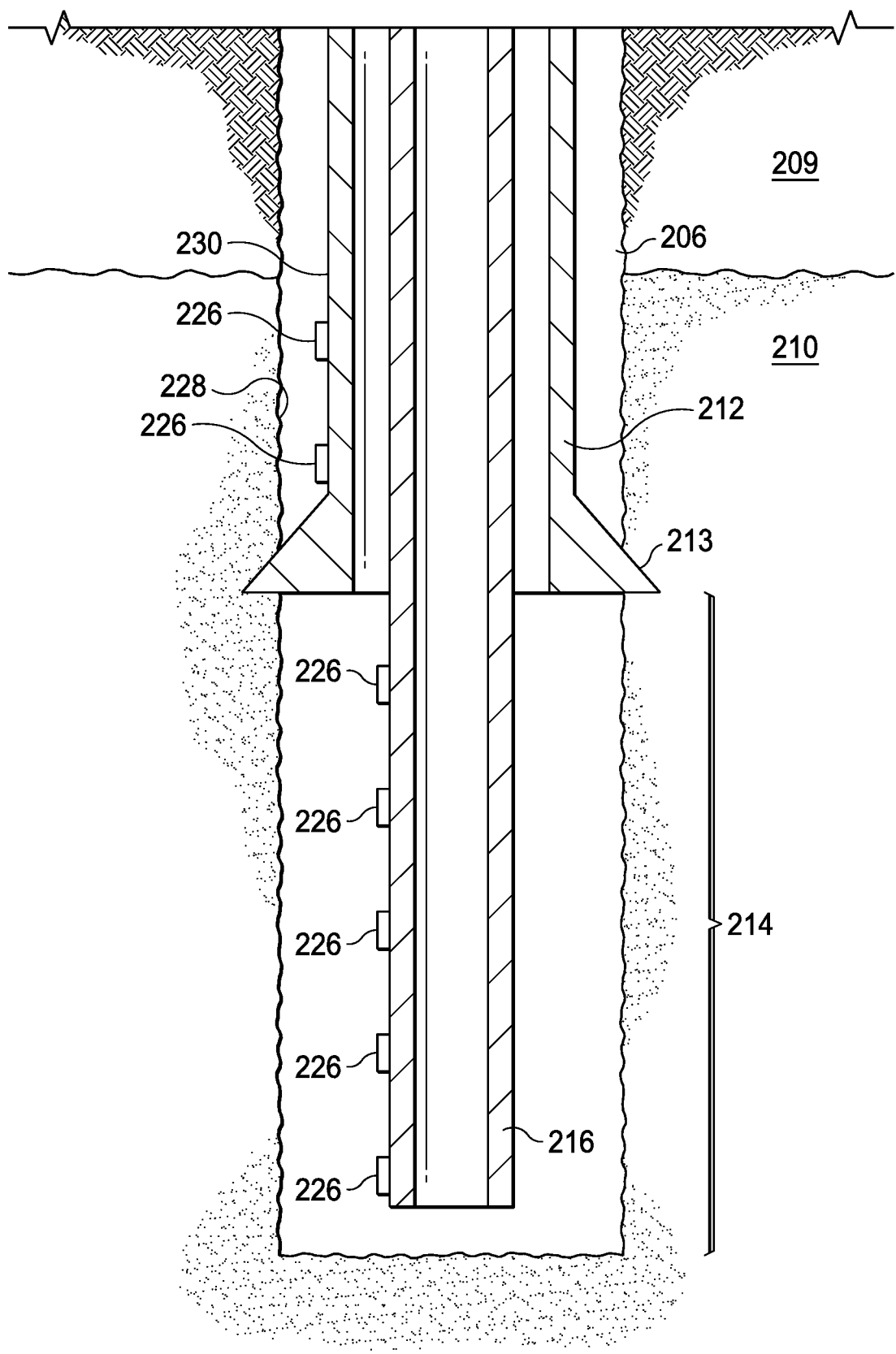
FIG. 3 is a cross-sectional view of a production tubing disposed within a well, the production tubing including sensors operable to detect electromagnetic energy downhole, according to some implementations of the present disclosure.

One or more sensors 226 are disposed within the well 206 and act as receivers to receive electromagnetic energy used to detect and map a waterfront. For example, in some implementations, the sensors 226 may be permanently installed in the well 206 in or near the openhole portion 214. In some implementations, the sensors 226 may be distributed along a length of the well 206 spanning the reservoir 210. In some implementations, the sensor 226 may be distributed along an entire length of the well 206 spanning the reservoir 210. In some implementations, one or more sensors 226 may be disposed on production tubing, on a casing of a well, or even on a wireline assemblage. As shown in FIG. 3, sensors 226 are disposed on the production tubing 216. In some implementations, sensors 226 may also be disposed on the casing 212, as also shown in FIG. 3. In the illustrated example, the sensors 226 disposed on the casing 212 are disposed between an inner surface 228 of the well 206 and an outer surface 230 of the casing 212. Typically, the space between the casing 212 and the geologic formation is filled with cement. In still other implementations, one or more of the sensors 226 may be integrated into the casing 212 or the production tubing 216. In still other implementations, sensors 226 may be installed in a non-cased well or openhole or in a non-metallic casing, such as a fiberglass casing.

As mentioned earlier, one or more sensors 226 may be incorporated into a wireline assemblage or tool and run into the well to a depth of the reservoir to conduct measurements. For example, the wireline assemblage may be run into the well to one or more depths to obtain $E_z$ measurements. For example, the wireline assemblage may be positioned at a depth at or near the oil-bearing formation, and the one or more sensors 226 may be used to detect the vertical electric field at the selected depth. However, unlike the permanent installation of sensors 226 to production tubing or a casing, measurements made by sensor 226 on a wireline assemblage are subject to depth and tilt errors when the wireline assemblage is used to perform time-lapse surveys. Further, permanent installations of the sensors 226 on or in the well casing or production tubing offer better signal strength and low noise levels as a result of the close proximity of the sensors 226 to the reservoir 210 and the fixed position and orientation of the sensors 226 relative to the reservoir 210 than temporary installations.

In some implementations, the sensors 226 are electric field sensors that are used to detect $E_z$. Example sensors for this purpose include contact-based galvanic electrode sensors and capacitive electric field sensor may be used to collect $E_z$ data. In other implementations, magnetic sensors may be used to detect the orthogonal components of a magnetic field (such as $H_x$, $H_y$, and $H_z$) using magnetic sensors, such as fluxgate magnetometers. For implementations in which magnetic field data is used to detect and map a waterfront, magnetic sensors may be used. Capacitive electric field sensors are described throughout the remainder of the disclosure for illustration purposes; however, other types of sensors may be used to detect electromagnetic energy for use in detecting and tracking a waterfront. The other types of sensors within the scope of the disclosure may be used and configured in manners similar to that described. Consequently, the scope of the disclosure is not limited to the use of capacitive electric field sensors.

Referring again to FIGS. 2 and 3, the sensors 226 are capacitive electric field sensors that may be similar to those described in U.S. Pat. No. 8,816,689, the entire contents of which are incorporated by reference. The sensor 226 may be connected to each other by an electrical umbilical segment. An uppermost sensor 226 may be connected to a data logger by way of a main umbilical.

FIG. 4 shows an example sensor 226 mounted to production tubing, which may be similar to production tubing 216. The production tubing houses sensor 226. Sensor 226 includes an elongated body 400 with an internal cavity 402.

The elongated body 400 has a curved inner surface 404 and a curved outer surface 406 in order to fit within the inner diameter of a well. Sensor 226 communicates with an electronic communications module, such as a data logger, by way of umbilical 408. Umbilical 408 may be, for example, an electrical umbilical. In some implementations, the umbilical 408 may be a tubing encased conductor 500, as shown in FIG. 5. As shown in FIG. 5, a tubing encased conductor 500 includes a tube 502 that surrounds a layer of insulation 504. A conductor 506 is located within insulation 504.

Returning now to FIG. 4, umbilical 408 attaches to sensor 226 at upper termination nut 410. Upper termination nut 410 is located near a first end of sensor unit 226. A conductor 412 exits the umbilical 408 at termination nut 410 an enters the cavity 402 by way of an upper passage 414 and is communicatively associated with both a printed circuit board electronics module 416 and electromagnetic sensor 418 before passing through a lower passage 420 and connecting to umbilical 422 at lower termination nut 424. Umbilical 422 may also be a tubing encased conductor similar to that shown in FIG. 5.

As can be seen in the embodiment of FIG. 4, an upper bulkhead connector pressure barrier 426 is adjacent to the upper termination nut 410 and seals upper passage 414 from the pressure of the downhole environment. A lower bulkhead connector pressure barrier 428 is adjacent to lower termination nut 424 and seals lower passage 420 from the pressure of the downhole environment. An intermediate bulkhead connector pressure barrier 430 seals an intermediate passage 432 from the pressure of the downhole environment. The upper passage 414, lower passage 420, and intermediate passage 432 form openings into internal cavity 402. In this example, the internal cavity 402 includes no other openings. The combination of barriers 426, 428, and 430 effectively seal internal cavity 402 from the pressures of the downhole environment, allowing the internal cavity 402 to be maintained at atmospheric pressure to protect the electronics module 416 and any other electronic components housed within internal cavity 402 from excessive pressures.

Outside of internal cavity 402, a recess 434 is formed in the outer surface 406 of sensor 226. At least one electromagnetic sensor 418 is located within recess 434. Insulators 436 are located on opposite sides of the electromagnetic sensor 418 within recess 434. Electromagnetic sensor 418 includes a low-frequency tri-axial capacitive electrode sensor, capable of collecting and reporting the electrical fields in three dimensions, and a low-frequency tri-axial magnetic field sensor capable of collecting and reporting the magnetic field in three dimensions and the change in magnetic field in three dimensions over time. Electromagnetic sensor 418 may collect both frequency and time-domain electromagnetic field data. The ability of electromagnetic sensor 418 does not depend on the chemical environment surrounding the electromagnetic sensor 418 or on the local wellbore temperature or humidity. Electromagnetic sensor 418 is capable of operating with or without electrolytes, and can be deployed permanently at the reservoir level without need of routine maintenance. Electromagnetic sensor 418 may either be in contact with the formation (reservoir) or completely isolated from the interior surface of a wellbore.

Although FIG. 4 shows an example construction of a sensor 226, the scope of the disclosure is not so limited. Other construction configurations of the sensor 226 may be used and are within the scope of the present disclosure. As also explained earlier, the scope of the disclosure is not limited to capacitive electric field sensors. Sensors such as contact-based galvanic electrodes sensors or other sensors operable to detect magnetic fields may also be used.

Installation of the sensors 226 on the production tubing 216 or on the well casing 212 removes the need of performing costly well killing operations that involve the introduction of high density fluids into the well 206 that overpressures the reservoir 210 and prevents further production of oil from the reservoir 210. The high density fluids that may be used during killing operations are generally conductive. Consequently, these high density fluids may also alter the time-lapse $E_z$ measurements if changing concentration and composition of the fluids occurs between a baseline measurement and a time-lapse measurement. The sensors 226 may be installed at various depths in the reservoir 210 to provide coverage of the reservoir interval. In some implementations, sensors 226 may be separated by 5 m along the length of the well. For example, in some instances, sensors 226 may be placed along the length of the reservoir at 5 m intervals. In other implementations, the separation distance between sensors 226 may be decreased to increase depth resolution with a lower signal. Conversely, the spacing between sensors 226 may be increased for greater signal at a lower depth resolution. The separation between sensors is related to a level of the signal-to-noise, resolution, or both that is desired.

Figure 6:
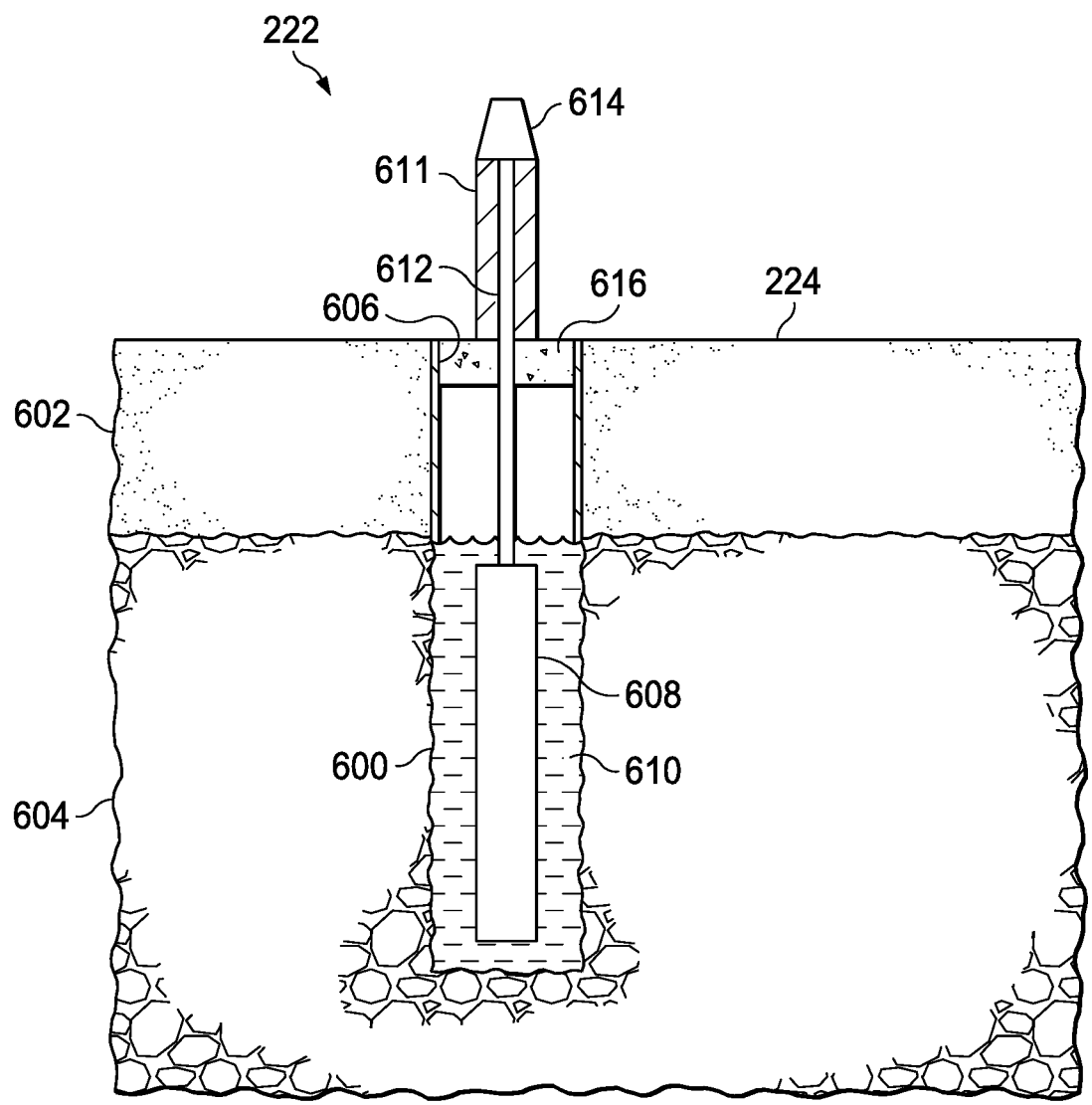
FIG. 6 is cross-sectional schematic view of an example shallow borehole electrode, according to some implementations of the present disclosure.

As mentioned earlier, the shallow borehole electrodes 222 are disposed azimuthally around the well 206, as shown in FIG. 2. FIG. 6 shows an example shallow borehole electrode 222. The example borehole electrode 222 is constructed using a shallow borehole 600, to bypass the accumulation of dry sands 602 at the surface and reach the rock substratum 604. In some implementations, the shallow borehole 600 may be 5 to 7 m in depth and eight inches in diameter. Although shallow borehole 600 is described as having a circular cross-section, the shallow borehole 600 may have any cross-sectional shape. In some implementations, a polyvinyl chloride (PVC) casing 606 may be disposed in the shallow borehole 600 along the interval of the sands 602. In other implementations, the casing 606 may be omitted.

The borehole electrodes 222 also include a first pipe 608 inserted into the shallow borehole 600 and coupled to the surrounding rock formation with a slurry 610 of carbon backfill to achieve electrical contact. In some implementations, the first pipe 608 may be approximately 50 millimeters (mm) in diameter, although other diameters are possible. A current used may be selected based on actual conditions, such as the construction of the well, the depth of the reservoir, the subsurface formations, and the length of the dipole. For a given dipole length, a better signal-to-noise ratio results for a higher electrical current that is injected into the ground. As an example, a dipole moment of 20,000 Ampere-meter (A·m) may be desired. If a contact resistance of 10 ohms between the slurry 610 and the surrounding rock formation and if the dipole length is 200 m, then a voltage of 1,000 volts is needed to generate the desired dipole moment. In some instances, 1,000 volts may be a maximum voltage in order to enhance operation safety. Therefore, by lowering the contact resistance between the slurry 610 and the surrounding rock formation, a lower voltage may be used. The first pipe 608 may be formed from steel or copper or another material having good electrical conductivity. The carbon backfill may be in the form of coke breeze. In other implementations, bentonite may also be used for the carbon backfill. A second pipe 611 is disposed at the surface 224 and extends above the surface 224. In some implementations, the second pipe 611 may extend approximately 70 centimeters (cm) above the surface, although other lengths are possible.

A wire 612 extends between the first pipe 608 and the second pipe 611. The second pipe 611 may be formed from steel or other metal. A terminal 614 is disposed at an end of the second pipe 611 and is operable to connect to the surface electric sources 202. In some implementations, the terminal 614 may extend above the second pipe 611 by approximately 10 cm, although other lengths are possible. An end 616 of the borehole electrode 222 is cemented. In some implementations, the cement may have a 30 cm cross-sectional length, although other lengths are possible.

With a construction of this type, the borehole electrodes 222 may achieve an average measured contact resistance of 2.0 ohms or less in a desert environment. Further, such a configuration may provide 100 A of current to the ground to achieve a useful signal-over-noise ratio in the borehole measurements. Consequently, borehole electrodes 222 of this configuration and, particularly, the reduced contact resistance that is achieved by this configuration are capable of providing large currents at low voltages, which improves operational safety.

The configuration of the shallow borehole electrodes 222, the time-lapsed nature of the reservoir monitoring, and the use of sensors 226 as describe earlier, preclude the need to condition or correct the acquired signals to account for resistivity distribution in the reservoir at a specific time. Variations associated with time-lapse measurements are presumed to occur in the reservoir and not in the overburden. Alternatively, changes in the overburden are negligible. Therefore signal variations over time are correlated directly to variations in saturation, which is the result of movement of the waterfront within the reservoir 210. If desired, the same time-lapse data can be used to evaluate a static resistivity distribution inside the reservoir. To provide useful information in the static context, though, would necessitate additional processing outside the scope of the disclosure and not required in the dynamic, time-lapse context.

The electric field response to the excitation signals generated by the dipoles 218 are measured by the sensors 226. The sensed electric field measurements, particularly, the vertical component of the electric field, are recorded with a data logger. The recorded electric field measurements may be transmitted to the surface through telemetry digital transmission. The data logger may be disposed at the surface 224, as shown in FIG. 2. In some implementations, the electric field measurements are stored in a hypercube database structure. A description of an example hypercube storage structure and processing thereof will be discussed in more detail later.

Figure 7:
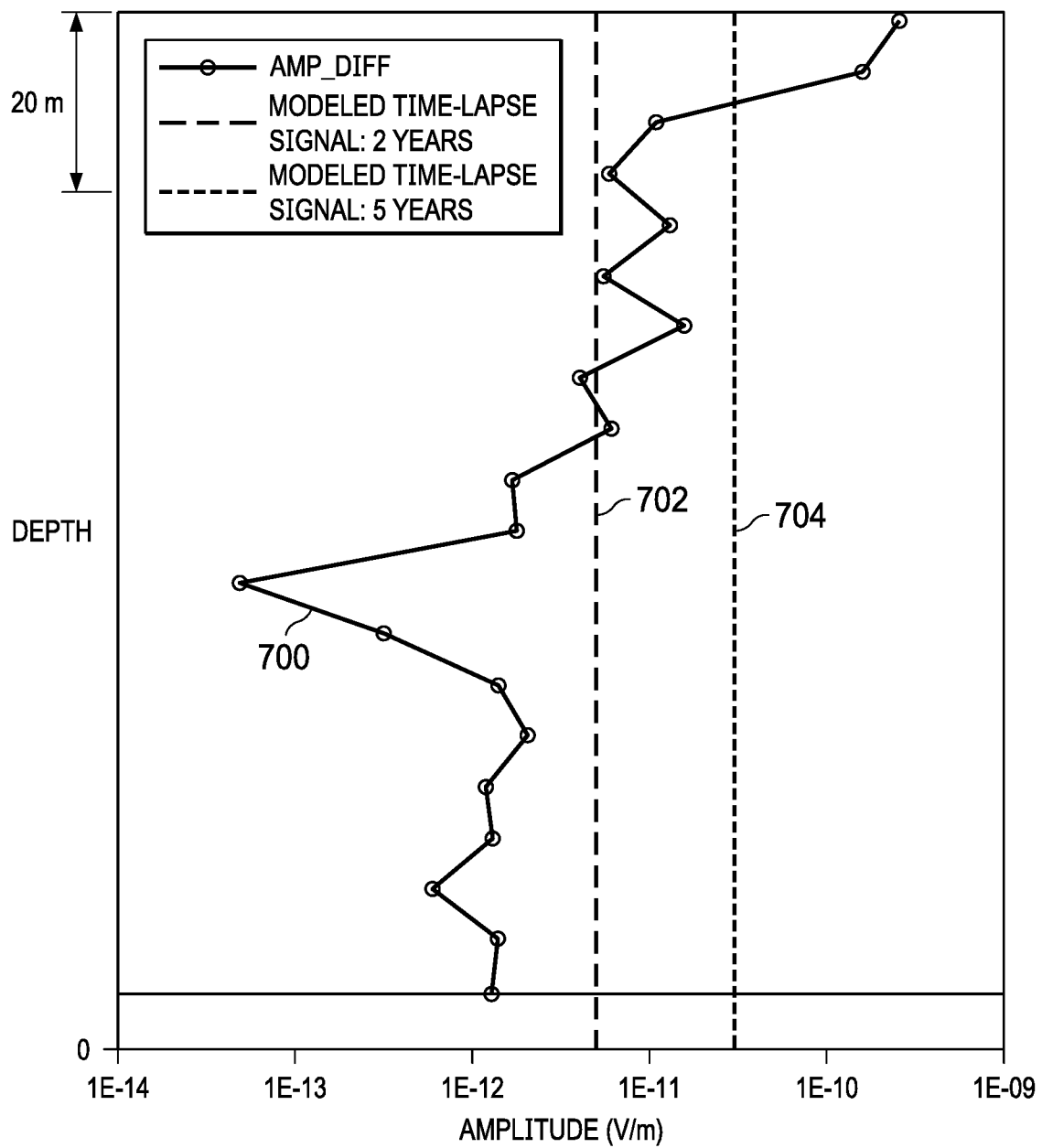
FIG. 7 is a graph showing a comparison between repetition error and time-lapse field strength variations, according to some implementations of the present disclosure.

Repetition errors associated with the vertical magnetic field, $E_z$, from repeated measurements compares favorably with time-lapse signal strength variations expected after two and five years of waterflooding. FIG. 7 illustrates the favorable repetition errors associated with $E_z$ measurements obtained with the 3D SBEM acquisition system 200 based on reservoir simulator models. The time-lapsed $E_z$ field amplitude variation 700 (measured in volts per meter (V/m)) with measurements taken four days apart. Because fluid saturation is a slow process, fluid saturation within the reservoir is essentially unchanged. Therefore, the differences in amplitude are the result of repeatability errors. These repeatability errors are compared to theoretical time-lapse responses modeled using a reservoir simulator for a two-year waterflooding 702 and five-year waterflooding 704, where the repeatability errors are viewed as relative changes of the signal strength. The signal strength gained in the two-year and the five-year waterflooding compares favorably with the measured differences in repeated measurements.

Figures 8, 9:
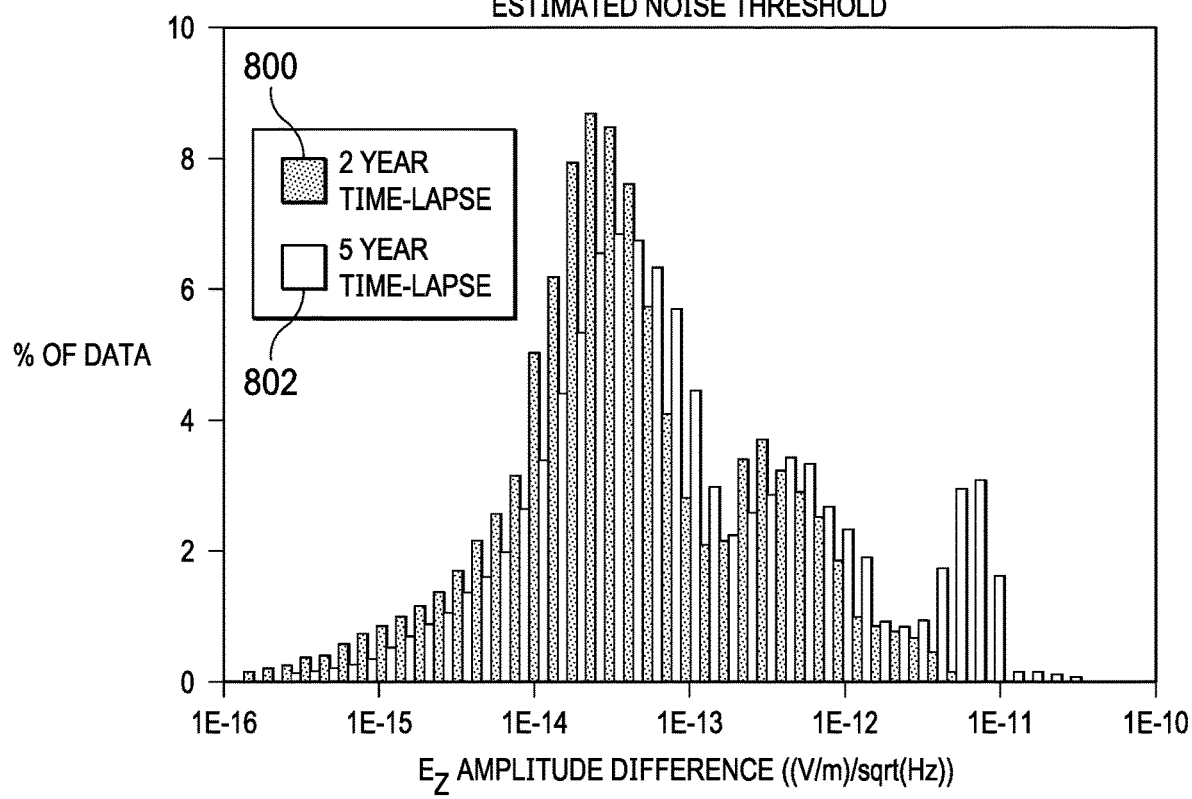
FIG. 8 is a histogram showing variation of vertical electric field ($E_z$) signals over a two year period of waterflooding and variations of the $E_z$ signals over five years of waterflooding based on electromagnetic (EM) data modeling, according to some implementations of the present disclosure.
FIG. 9 is an illustration showing modeled time-lapsed electric field signal variations as a result of waterflooding, according to some implementations of the present disclosure.

FIGS. 8 and 9 show further illustrations of modeled time-lapse electric field signal variations as a result of waterflooding versus amplitude repetition error of the vertical electric field as measured in a well. In this example, the model is a finite-difference model FIG. 8 is a histogram showing the variations 800 of the $E_z$ signals over two years of waterflooding and the variations 802 of the $E_z$ signals over five years of waterflooding based on modeling. In this example, the model is a finite-difference model. FIG. 9 shows modeled maximum variations in strength of a vertical component, $E_z$, 900 and a horizontal component, $E_x$, 902 of an excitation signal, $J_x$, 904 generated by a transmitter, such as a surface electric sources 202 described earlier.

Referring again to FIG. 2, in some implementations, the surface electric sources 202 may be in the form of a transmitter. Example transmitters include the MESA transmitter produced by Schlumberger Limited of 5599 San Felipe, 17th Floor, Houston, Tex. 77056; the TXM-22 transmitter produced by Metronix Geophysics of Metronix Meßgeräte and Elektronik GmbH, Kocherstr. 3, D-38120 Braunschweig, Germany; and XTM-32 transmitter manufactured by Zonge of 39 Raglan Avenue, Edwardstown, South Australia 5039. In some instances, the surface electric sources 202 may be regulated by a GPS-synchronized high precision clock. In other implementations, the surface electric sources 202 and the receiver(s), that is, one or more sensors 226, can be connected to the same data logger system rather than being connected to separate data logging systems. By connecting the surface electric source 202 and the sensor or sensors 226 to the same data logging system, improved data repeatability is achieved, because time synchronization errors are avoided.

Signals produced by the surface electric sources 202 may be in the form of a wave. The signal waveform can be designed depending on the conditions at the wellsite, including conditions downhole and within the formations, such as formations 209 and 210. Consequently, signal waveforms produced by the surface electric sources 202 may be selected to be frequency-domain sweep (100% duty-cycled) waveforms, time-domain (50% duty-cycled) waveforms, pseudo-random binary sequences, or a combination of the above. In some implementations, frequencies in the range of 1 hertz (Hz) to 1000 Hz may be used. In other implementations, frequencies greater than or less than the indicated range may be used. In some implementations, a dipole moment of the surface electric source may be approximately 20,000 A·m. In the discussion that follows and modeling described, 100% duty-cycled, frequency-domain source signals are used. However, as mentioned above, other types of waves may be used exclusively or in combination with other types of waveforms to produce similar results capable of detecting movement of a waterfront within the reservoir 210.

Referring again to FIG. 2, in operation, the surface electric sources 202 generate an excitation signal of a selected frequency that is transmitted through the formation 209 and reservoir 210 by the dipoles 218. In response to the excitation signal generated by the surface electric source 202, a current is introduced into the formations 209 and 210 by the shallow borehole electrode 222 and the casing 206. The introduced current leaks into the formations 209 and 210 along an entire length of the casing 206, including the casing shoe 213. Current leakage at the casing shoe 213 results in a sharp change in conductivity and defines an end point and an extreme injection location of the electric currents.

FIG. 2 shows an idealized representation of the electric field behavior generated by the electric currents produced by the dipoles 218 in which the electric field between the surface borehole electrode 222 and the casing 206 is distorted by the casing 206. As shown in FIG. 2, this simplified representation shows outside EM fields 232 extending from a hypothetical line 215 connecting the surface borehole electrode 222 to the casing shoe 213 of the casing 206 to increasing distances from the well. The simplified representation shows the EM fields 232 having a pseudo-circular distribution. The EM fields 232 investigate the conditions of the formations 209 and the formation 210 at increasing distances from the well 206. A distance away from the well that the EM fields 232 penetrate the formations 209 and 210 may be affected by two primary factors. Those two factors are (1) an offset or radial distance between the surface borehole electrode 222 and the well 206; and (2) a frequency of the EM fields 232, which is controlled by the surface electric source 202.

A combination of a surface electric source 202, a dipole 218, and a sensor 226 forms the signal transmission system 104 shown in FIG. 1. In some instances, the signal transmission system 104 may encompass a plurality of surface electric sources 202, dipoles 222, and sensors 226, such as in the example shown in FIG. 2.

Figure 10:
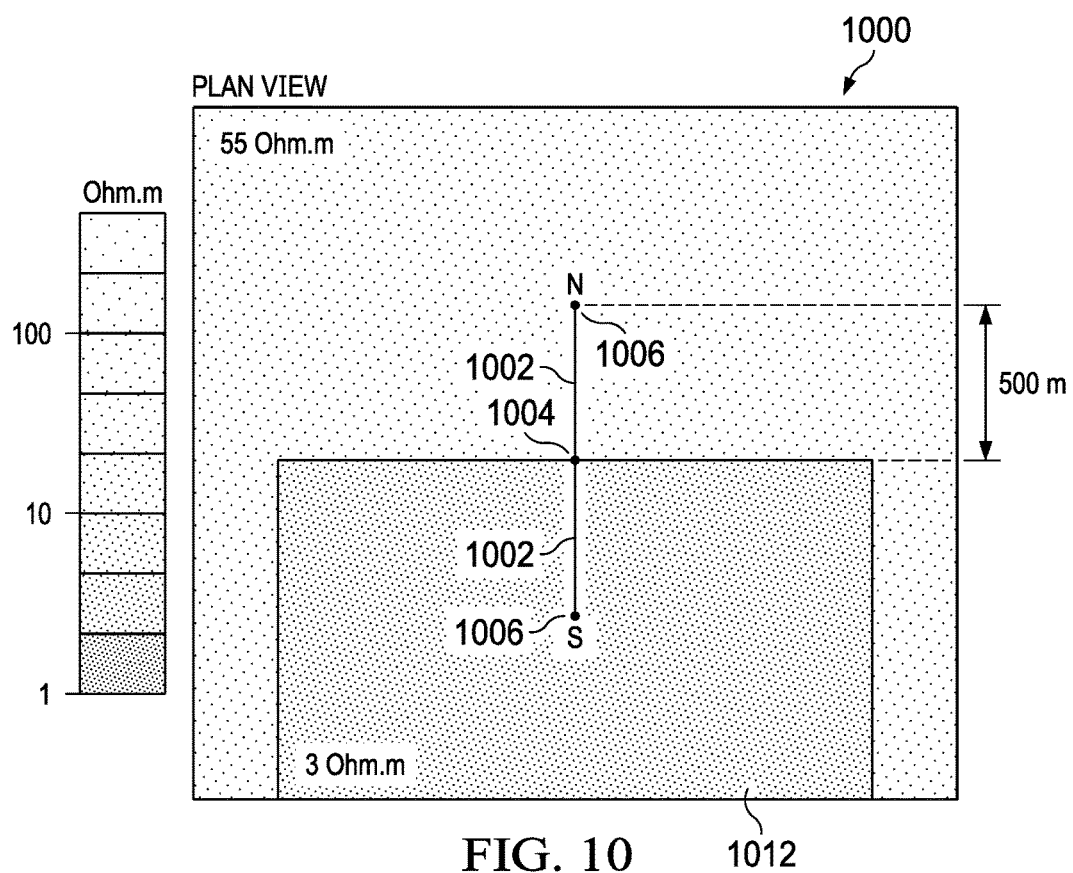
FIG. 10 is a plan view of a subsurface model that include a waterfront present in a reservoir, according to some implementations of the present disclosure.
Figure 11:
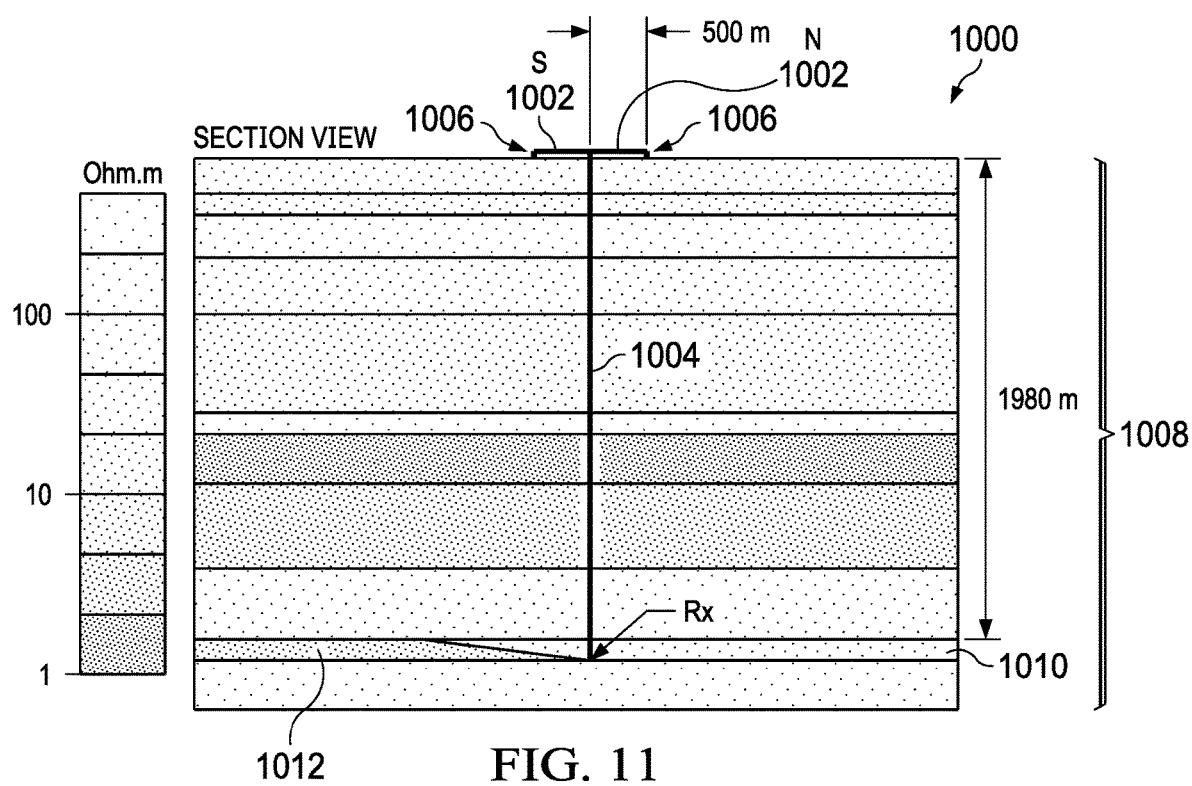
FIG. 11 is a section view of the subsurface model of FIG. 10, according to some implementations of the present disclosure.

FIGS. 10 and 11 show a plan view and a section view, respectively, of a reservoir model 1000. The reservoir model 1000 represents an example model at a given point in time. Dipoles 1002 are similar in construction to the dipoles 222 described earlier. The model 1000 includes a plurality of formations 1008, which includes an oil-bearing reservoir 1010. The model 1000 illustrates the ability of a 3D SBEM acquisition system, which may be similar to the 3D SBEM acquisition system 200 discussed earlier, to detect movement of a waterfront within an oil-bearing reservoir over time.

The sensitivity of detecting a waterfront by the 3D SBEM acquisition system of the model 1000 is demonstrated in the context of a modeled advancing waterfront 1012 that has a slanted configuration. The 3D SBEM acquisition system of model 1000 is used to monitor the waterfront 1012 at different distances of the waterfront 1012 from the well 1004 and for different excitation signal frequencies. For each dipole 1002, a length of the dipoles 1002, that is, a distance between the azimuthal shallow borehole electrodes 1006 and the well 1004, is 500 m. However, the dipole length described is used merely as an example. Consequently, the dipole length may be varied depending on the specific application. For example, a radial offset of the shallow borehole electrode 1006 from the well 1004 may be increased to enhance spatial and vertical resolution of the waterfront 1012 in response to a sweep of signal frequencies transmitted by the dipoles 1002. Additionally, the length of the dipole may be altered based on a depth of the reservoir below the surface. Changing a length of a dipole changes a volumetric sampling of the space around the well. Increasing the dipole length increases the dipole moment. The example model 1000 uses a frequency-domain method. However, use of a time-domain methodology or a combination of frequency-domain and time-domain methodology is capable of providing equivalent results. For example, a time-domain based on a 50% duty-cycled signal can be used.

Definitions of a source waveform generated by the surface electric sources within the scope of the disclosure encompass a wide-variety of waveforms. For example, square waves, modulated signal on the square waves, slanted square waves (that is, a transient time-frequency combination), and Pseudo-Random Binary Series (PRBS) may be used in time-domain applications, frequency-domain applications, or a combination of time-domain and frequency-domain applications.

The model 1000 represents a typical situation where the waterfront 1012 is approaching from one side of the well 1004 while the other side of the well 1004 is undisturbed. The model 1000 represents a realistic case scenario in terms of depth and of resistivity contrasts. In addition, the slanted shape of the approaching waterfront 1012 accurately represents reality given that water is denser than oil and flooding typically proceeds from a more downhole position to an uphole position in the reservoir 1010.

Figure 12:
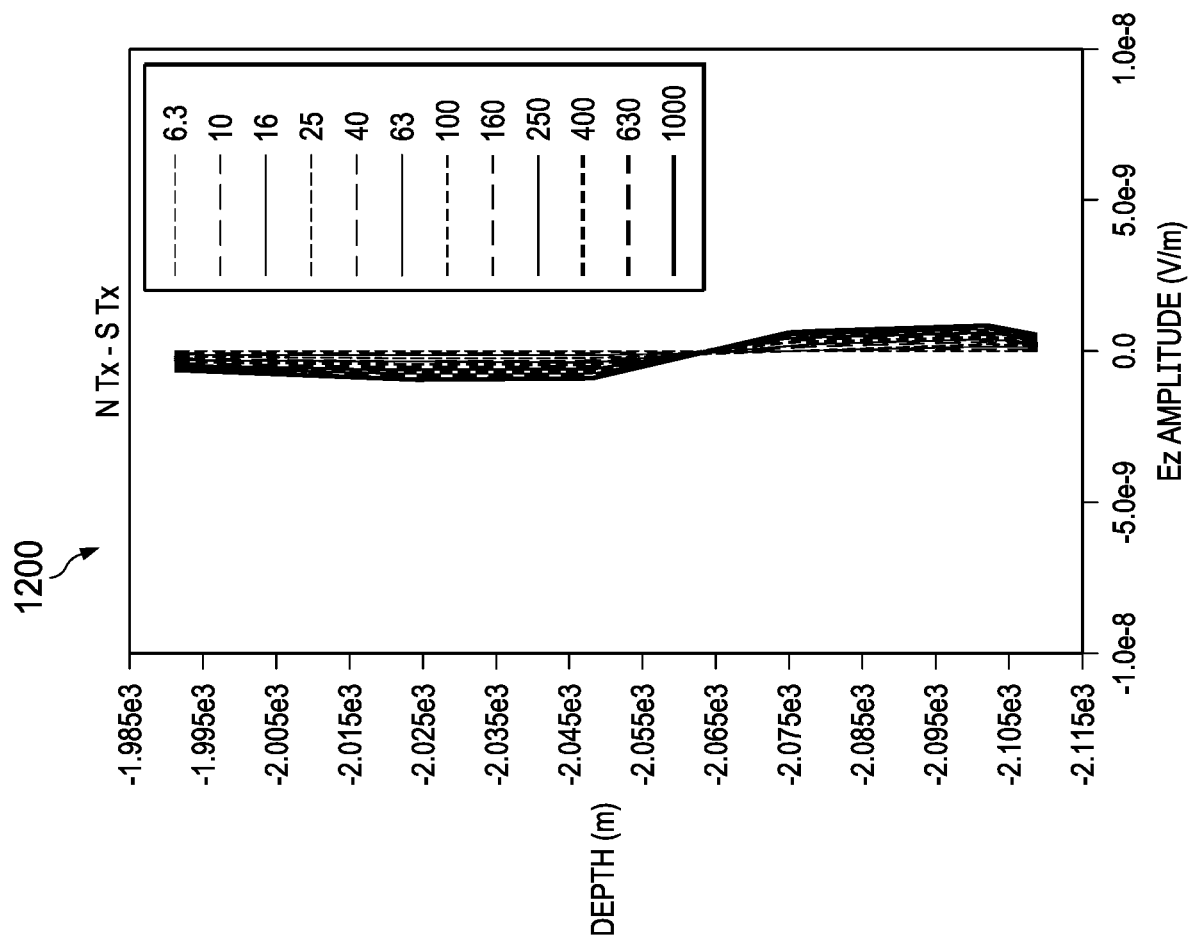

EM data modeling is performed by running a simulation using the model 1000 to obtain simulated EM responses to changes in position of the waterfront 1012 based on the 3D SBEM acquisition system of the model 1000. In the course of running the model 1000, excitation frequencies from each of the dipoles 1002 are generated. The excitation frequencies from each dipole 1002 interact with the waterfront 1012, and differences between the responses for the dipoles 1002 are analyzed. As indicated earlier, the position of the waterfront 1012 is modeled at different positions in order to verify detection of the waterfront by a 3D SBEM acquisition system of the model 1000. The waterfront 1012 is modeled at 300 m, 75 m, and at 0 m, that is, at a position where the waterfront 1012 was touching the well 1004. FIGS. 12, 13, and 14 illustrate the waterfront 1012 as these positions, respectively. Spacing of the receivers, such as sensors 226, in the illustrated model is 3 m. Other receiver spacings are possible. The response measured in this example (and displayed in FIGS. 12, 13, and 14 as 1200, 1300, and 1400, respectively) is that of the amplitude of the vertical electric field. The response of the vertical electric field that is displayed in FIGS. 12, 13, and 14 illustrates how the vertical electric field amplitude changes with the position of the waterfront within the reservoir. Additionally, the multiple graphs in each of FIGS. 12, 13, and 14 represent the vertical electric field response to different excitation signal frequencies. Thus, $E_z$ response changes as a function of the frequency of the excitation signal. However, similar responses are observable in the context of the phase of the vertical magnetic field, the real and imaginary components of the frequency-domain of the vertical magnetic field, or both.

Figure 15:
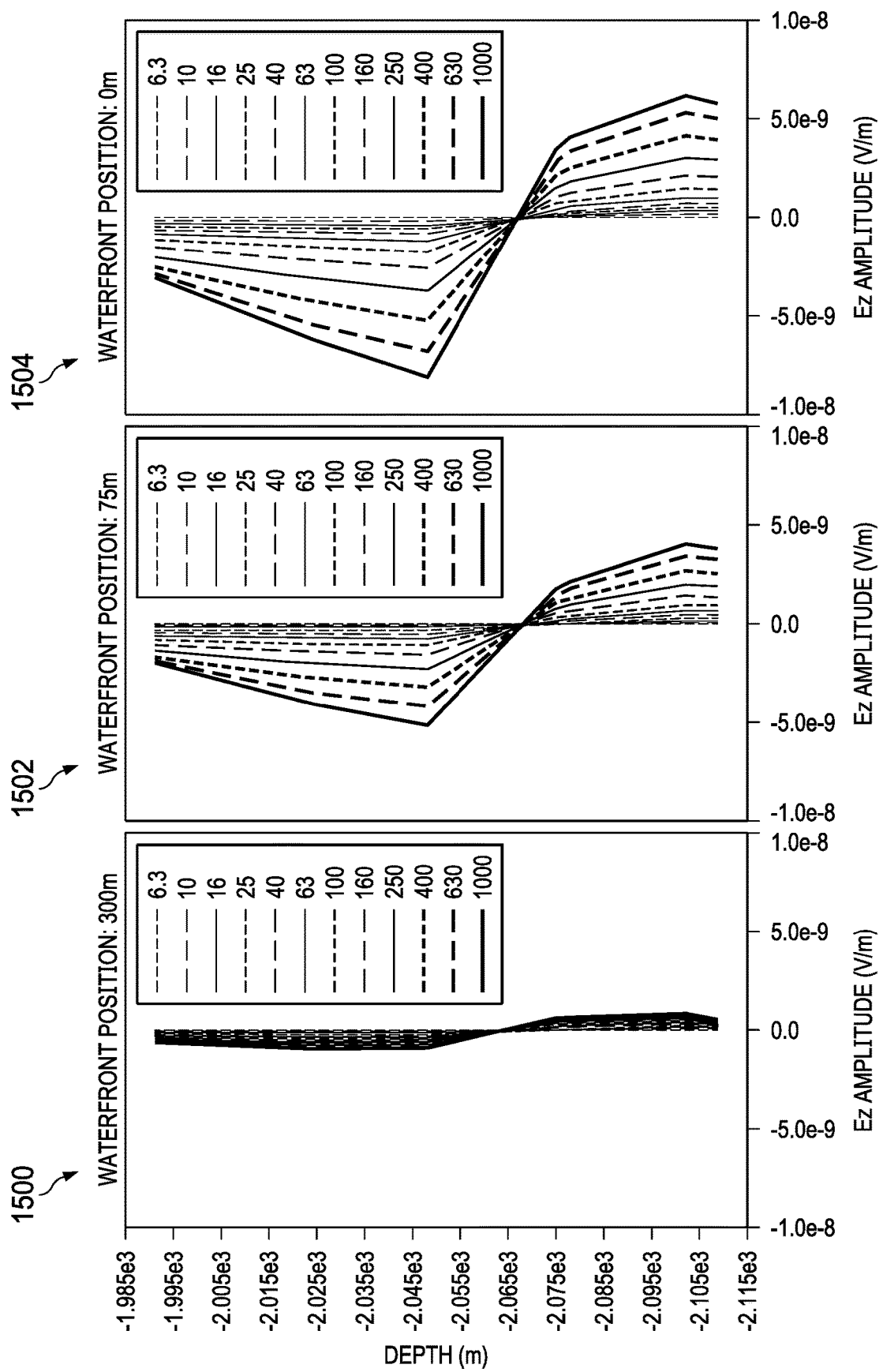
FIG. 15 is a graph of the simulated response variations of FIGS. 12, 13, and 14, according to some implementations of the present disclosure.

A normalized amplitude response of the vertical magnetic field for each of FIGS. 12, 13, and 14 is shown in FIG. 15 at 1500, 1502, and 1504, respectively. The amplitude response of the vertical magnetic field is normalized by a length of the dipole 1002 and by the source moment. In some instances, the dipole moment of the surface electric source, such as surface electric source 202, may be approximately 20,000 A·m. The different graphs shown in FIG. 15 correspond to an amplitude of the vertical electric field in response to a different excitation frequency for each of the waterfront positions. As is shown, the amplitude response becomes more pronounced as the waterfront 1012 approaches the well 1004. That is, the amplitude response of the vertical electric field becomes more pronounced as a distance between the waterfront 1012 and the well 1004 decreases. These simulated responses shown in FIGS. 12, 13, and 14 are a function of a receiver position in the well 1004 (that is, a position in the well 1004 of one or more sensors, such as sensor 226 described earlier), a distance of the waterfront 1012 from the well 1004, and the frequency being modeled.

The presence of the waterfront 1012 is detected by an array of receivers or sensors (such as sensors 226, described earlier) as a function of a depth of the receiver in the well 1004, a distance of the waterfront 1012 from the well 1004, and the frequency content of the signal transmitted by the dipoles 1002. In general, higher frequencies provide increased sensitivity to detecting the waterfront 1012 and, hence, a position of the waterfront 1012 relative to a position of the sensors. In this case, because the sensors are disposed at a depth within the well, the use of higher frequencies provides increased sensitivity to a position of the waterfront 1012 to the well 1004.

Another influence on the detection of the waterfront 1012 using this acquisition system is a distance of the shallow borehole electrode 1006 from the well 1004. The effect of varying a position of the shallow borehole electrode 1006 was not illustrated, because the position of the shallow borehole electrode 1006 relative to the well 1004 remained unchanged at each change in position of the waterfront 1012.

Use of the model 1000 establishes that the combination of such information (that is, the position of the shallow borehole electrode 1006, the excitation frequencies being used, and the position of the receivers in the well 1004) can be used to predict the EM response of the approaching waterfront before it has reached the well. Additionally, the simulated responses are above a noise floor and are directly comparable with the data illustrated in FIGS. 7, 8, and 9. Here we can observe that the minimum normalized signal strength that can be measured above the noise floor is set to 1.0 E-12 V/m. In some instances, the noise floor may be determined experimentally. The modeled responses, that is the difference between the measured vertical electric fields from the first and second dipoles 1002, are well above the measurement noise threshold, establishing that the method is effective in monitoring movement of the waterfront 1012 within reservoir 1010. In some implementations, determining anomalous $E_z$ field responses may be performed by taking the difference between the response of a South dipole (that is, a dipole situated to the south of the well) and the response of the North dipole (that is, the dipole situated to the north to well). This difference corresponds to the difference between a response "with waterfront" and the response "without waterfront."

Returning again to FIG. 1, the system 100 for detecting and mapping a waterfront also includes a data processing system 106. The data processing system 106 includes a state-of-the-art signal processing analysis for frequency-domain data and including stacking of Fourier transforms to a enhance signal-to-noise ratio of the measured data. The data processing system 106 encompasses the evaluation of the acquired EM signals in dynamic conditions (such as under time-lapse conditions).

The data processing system 106 performs state-of-the-art analysis of the data recorded at the surface transmitter and downhole receivers. That is, the data processing system 106 processes the original signal data recorded by the surface transmitter and the resulting signal detected by the downhole sensors, such as sensors 226. The data processing system 106 has the ability to stack the acquired data in both the time and Fourier domains. Robust spectral estimates of the transmitted electrical field are found through a robust rejection scheme based on source-receiver coherency and variance of the stacked spectral estimates. The final spectral estimates are corrected for the system response and normalized to remove the source moment before being passed to the data analysis system with machine learning ("ML") 108 (shown in FIG. 1). This data processing system encompasses the evaluation of the acquired EM signals in dynamic (that is, time-lapse) conditions.

Still referring to FIG. 1, output from the data processing system 106 is input into a data analysis system with ML 108. Time-lapsed measurements are used to capture dynamic conditions associated with movement of a waterfront in the reservoir over time. Thus, the time-lapsed measurements are used to monitor movement of the waterfront over time dynamically. This dynamic scenario is conceptually simpler than a static scenario, because a parameter of the dynamic scenario that is expected to change is water-oil saturations in the reservoir due to the waterflooding process. As mentioned earlier, the oil-water fluid substitution produces a large bulk resistivity variation in the reservoir that is targeted with the time-lapse EM measurements.

Generally, spatially mapping the resistivity variations in the reservoir at the correct positions in the reservoir and quantifying the resistivity variations in terms of water-oil saturations may involve an additional step of using a 3D inversion. Such a 3D inversion may be formulated, for example, by a solution of a linearized system of equations relating the changes in the data to the changes in model properties using the laws of physics, such as Maxwell's equations. This approach, however, is laborious both in preparation and execution. For example, execution may involve considerable specialist analysis and intensive calculations typically performed on computer clusters. This approach involves considerable cost and considerable computing and memory resources. Consequently, standard 3D inversion approaches are not well suited for real-time data analysis.

The intensive and costly computations associated with a 3D inversion are avoidable using ML. ML is inexpensive and may be made automatic, requiring little to no input from a user. ML techniques can be designed to mimic and act as surrogate for a 3D inversion to reconstruct a position of the waterfront in a reservoir relative to a well using data collected by an SBEM acquisition system (such as the SBEM acquisition system 200 depicted in FIG. 2). Input to a ML technique is visualized as the graphs shown in FIG. 15, for example. As discussed in more detail later, the responses shown in FIG. 15 are converted into images patterns as part of a hypercube.

The response in amplitude and phase or, alternatively, of real and imaginary components of the vertical electric field $E_z$ can be displayed as a continuous variation. The continuous variation is a function of: (1) a position of the waterfront relative to the well; (2) a frequency of the transmitted signal; (3) a position of a receiver (that is, sensor) in the well; and (4) a radial offset of the surface electrodes relative to the well head.

Referring again to FIG. 15, the simulated responses associated with the position of the waterfront 1012 relative to the well 1004 shown in FIGS. 12, 13, and 14 are shown. These responses can be tabulated as a multi-dimensional hypercube. The amplitude and phase of the $E_z$ can be modeled as a continuous variation relative to at least four parameters. For example, in some implementations, the $E_z$ is modeled as a continuous variation of a position of a waterfront in a reservoir relative to a well; a frequency of a signal generated by a surface electric source; a position of an electric field sensor in the well; a radial offset of a source electrode of an electric dipole relative to a well head of the well; and an azimuth location of the associated dipole.

Figure 16:
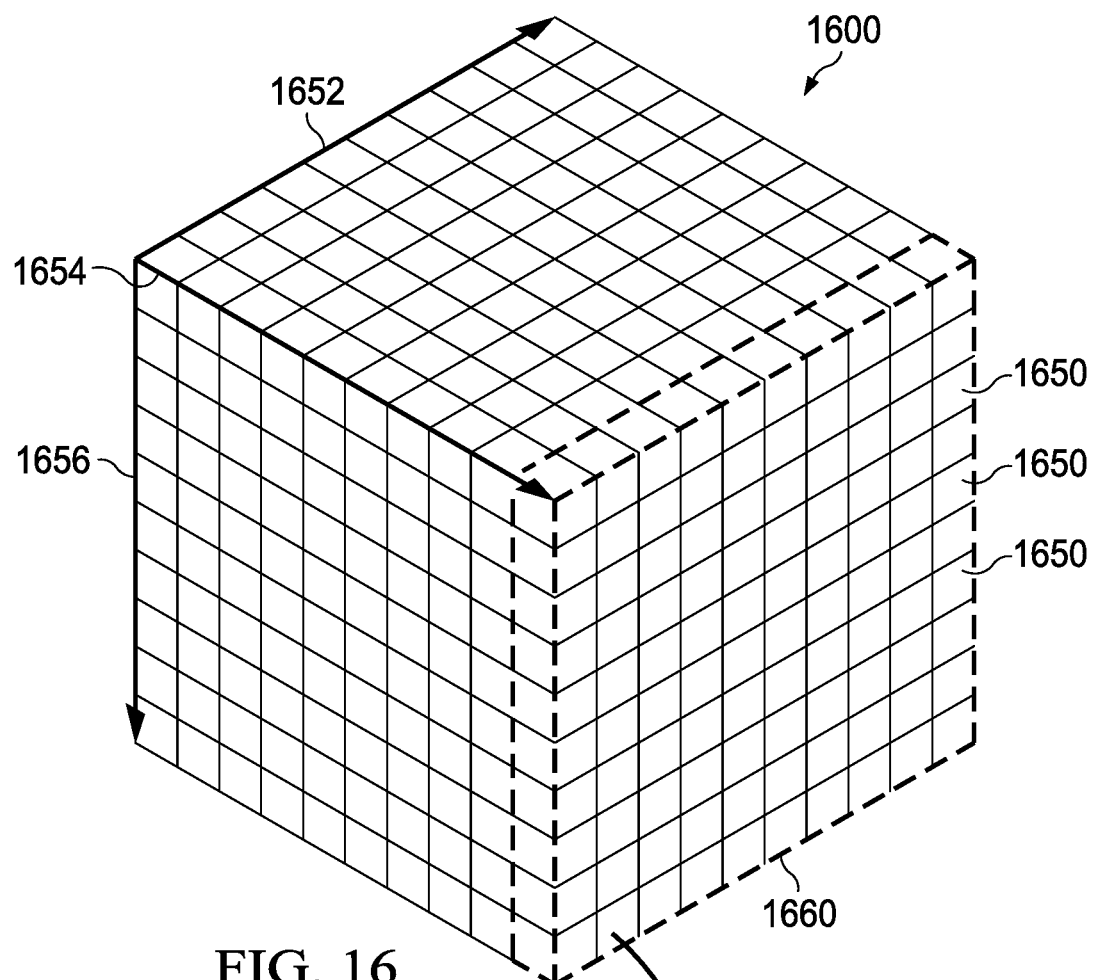
FIG. 16 is a graphical representation of a multi-dimensional hypercube, according to some implementations of the present disclosure.

The responses shown in FIG. 15 are tabulated as a multi-dimensional EM data hypercube 1600 that is shown in FIG. 16. The hypercube 1600 arranges the continuous variation of the $E_z$ field as a function of the waterfront position in the reservoir. The large amounts of time-lapse data collected in the course of monitoring the waterfront movement may be organized in the hypercube 1600. A hypercube is described in U.S. Pat. No. 10,067,255, the entire contents of which are incorporated by reference. The hypercube 1600 is a large three dimensional dataset that is organized in a single cubic volume composed of a number of voxels or bins of 1650, where each voxel 1650 stores a collection of $E_z$ data occurring in a three dimensional space. The SBEM data are arranged in the hypercube 1600 along an X- and Y-axes according a location of the midpoint position between the source-receiver, referred to as (XY), and along a Z-axis that represents an offset (O) of this midpoint below the surface as the vertical dimension. This offset (O) is referred to as a pseudodepth. This dataset is represented as (XYO). In some instances, azimuth data may also be included in the voxels 1650. This collection of data is represented as the (XYOA) domain. Thus, the X-axis 1652 represents the X-coordinate of the midpoint between the surface electric source and the receiver (that is, the sensor) within the well; the Y-axis 1654 represents the Y-coordinate of the midpoint between the surface electric source and the receiver; and the Z-axis 1656 represents the offset (O) or the distance of the surface electric source from the receiver. This offset is referred to as a pseudodepth. The azimuth (A) data represent the azimuth of the surface electric source.

In the case of SBEM data, each voxel 1650 of the hypercube 1650 includes amplitude, phase (or real-imaginary components), field polarization (x, y, z), and frequency of the signal received by the receiver. As explained earlier, the voxels 1650 may also include azimuthal data. This arrangement of the data is useful for enabling pattern recognition and training of different ML algorithms. Each voxel 1650 of the hypercube can be thought as a collector of data sharing the same midpoint position (that is, midpoint between surface electric source and receiver) and same offset (XYO). For 3D radial surface geometries, the sorting is extended to azimuth representing azimuthal sectors in degrees chosen by the user.

Within each voxel 1650 statistics are calculated on $E_z$ data assigned to that voxel to determine multimodal distributions of $E_z$ data (according to mean, median, mode, standard deviation, kurtosis, and other suitable statistical accuracy analytical measures).

This methodology allows statistical representation in a single volume of a large three dimensional $E_z$ dataset into a single organizational module for processing and analysis. The $E_z$ data are assembled into a group for statistical analysis, rejection of anomalous or aberrant data, which are known as outliers, and the $E_z$ data are verified for consistency of the results. A visual inspection of the $E_z$ dataset is made possible by dissecting the volume of the hypercube 1650 with various planes, and, as an additional step, analytical functions can be derived to describe the distribution of the property in the volume and to possibly predict data where gaps are present.

Figure 17:
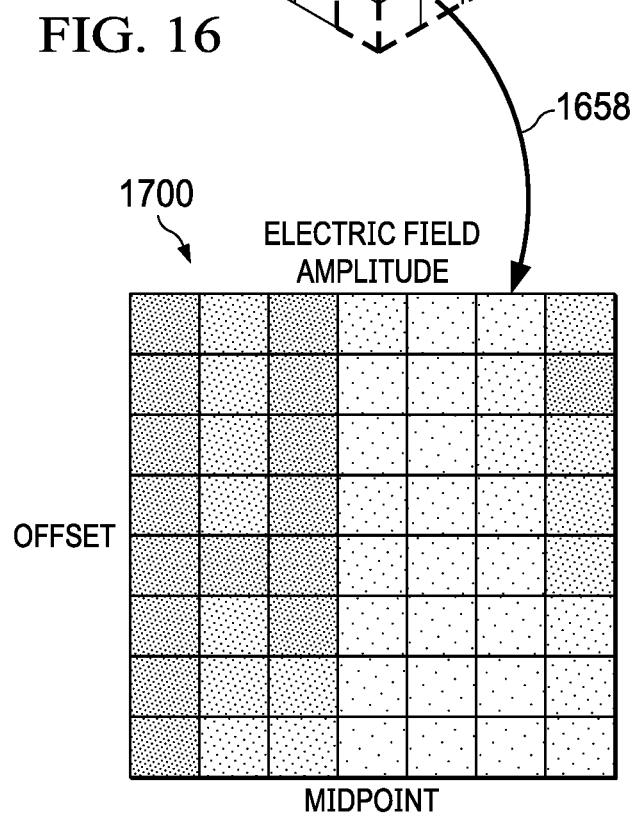
FIG. 17 is a schematic diagram of statistics obtained for the vertical electric field data for a data bin of the hypercube of FIG. 16, according to some implementations of the present disclosure.

An example section of the hypercube 1650 is shown in FIG. 17 and represents an amplitude pattern of the measured E, and the amplitude of the $E_z$ indicates the presence of the approaching waterfront within the reservoir. More particularly, FIG. 17 illustrates the amplitude of the vertical electric field within a plane, that is, the plane 1660 shown in FIG. 16.

In the context of amplitude of the $E_z$, the amplitude data is sorted into individual binned cubes represented by the individual voxels 1650.

Figure 18:
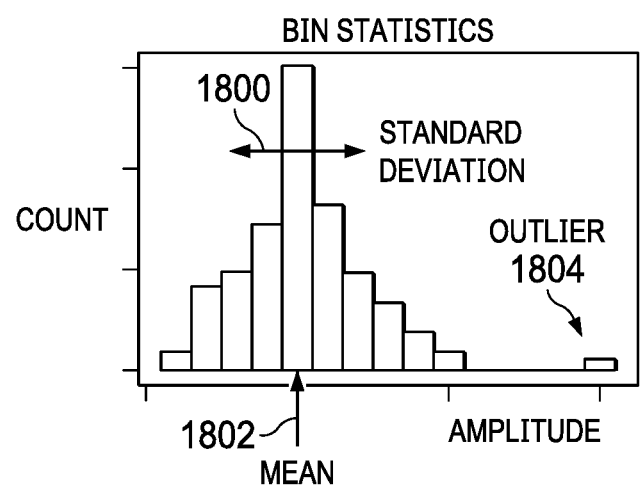
FIG. 18 is an example plot of amplitude data of vertical electric fields, according to some implementations of the present disclosure.

The standard deviation ($\sigma$) of the amplitude values for an example voxel 1650 is indicated schematically in FIG. 18 at 1800, while a mean value of amplitude is indicated schematically at 1802. An anomalous or aberrant amplitude or outlier is indicated schematically at 1804 in FIG. 18. Based on the other amplitude values of the voxel 1650 in FIG. 16, the outlier amplitude 1804 is one not satisfying the statistical filtering, and thus statistically unreliable. If included in amplitude picking, an outlier value such as that at 1804 is likely, if included, to distort the accuracy of further processing of the survey data. Referring again to FIG. 17, the example plot 1700 of $E_z$ amplitude data for a certain offset as indicated by an arrow 1658 referencing the location of that offset in the hypercube 1600. The amplitude data mapped in FIG. 17 are statistically processed values, after removal of outliers.

Through the use of a reservoir simulator, several instances of fluid distributions in the reservoir are generated, and corresponding forward calculations of EM fields are performed with the specified SBEM acquisition system geometry after transformation of saturations into resistivity. An example reservoir simulator that is within the scope of the disclosure is described in Dogru, A. et al., "A Next Generation Parallel Reservoir Simulator for Giant Reservoirs," Society of Petroleum Engineers, SPE Reservoir Simulation Symposium, 2-4 February, The Woodlands, Tex. 2009. The reservoir simulator is operable to generate one or more reservoir models based on the applied data. The reservoir models may be updated by history-matching with actual production data.

The set of reservoir models and hypercubes containing the EM data form a knowledge-base that is used to perform automatic unsupervised or supervised training of a machine learning system. With the use of the reservoir models and hypercubes, the ML system is trained using realistic and physically-constrained dynamic flow simulator distributions of saturations obtained through history of the reservoir as opposed to theoretical models with a random distribution of parameters. As a result, the ML system is trained through time-history benchmarking by production data and supported by the physics of fluid dynamics rather than with randomly selected models. The ML system is operable to discover patterns and relationships among the data automatically using statistical techniques such as cluster analysis and pattern recognition.

Figure 19:
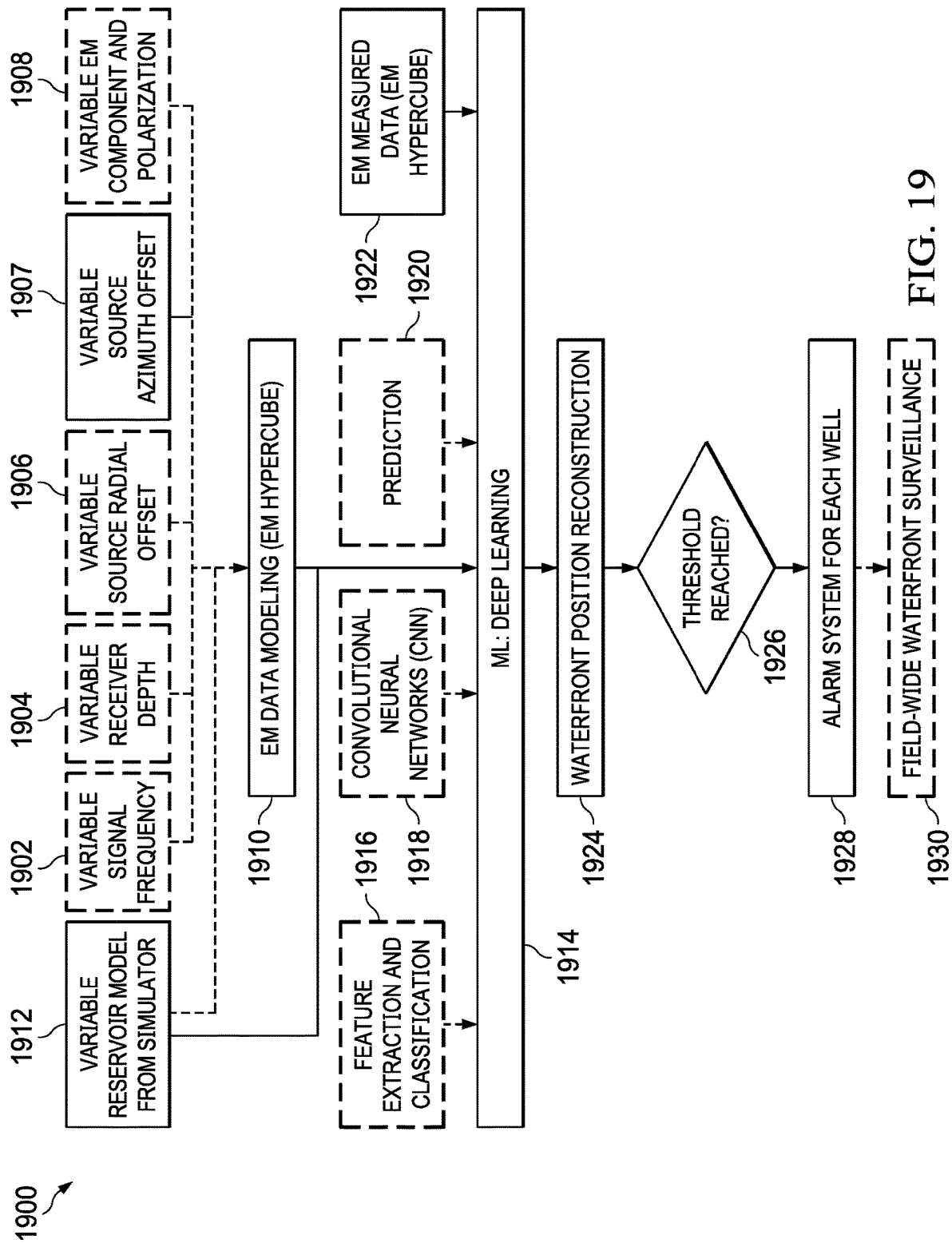
FIG. 19 is a flowchart of an example waterflood surveillance system, according to some implementations of the present disclosure.

An example ML system within the scope of the present disclosure is a Deep Learning System ("DLS"). Deep learning is also known as deep structured learning or hierarchical learning and is based on neural network methods including convolutional neural networks (CNNs). The DLS includes stacked sequences of autoencoders, followed by classification layers (such as CNNs) that are used to predict patterns. Such a process produces a regression between reservoir models and data that are used to predict the saturation distributions from the actual EM field data measured with the SBEM acquisition system geometry depicted in FIG. 2. The measured $E_z$ amplitude data are then used to predict the state of the reservoir saturation after automatic training of the CNN. An automatic and instantaneous determination of the waterfront position within the reservoir relative to the well is then achieved with an example waterflood surveillance system 1900 shown in FIG. 19.

The CNN is the process by which the DLS is trained with the use of synthetic data, such as $E_z$ data, generated from various instances of the reservoir model. This training process builds a regression or multiple regressions between measured data (such as measured $E_z$ response data) and the reservoir models, which include saturation patterns, waterfront position, etc. The regression or regressions are then used to predict the behavior of the reservoir model (including waterfront position and saturation patterns) from real data that are recorded with the SBEM method. Resistivity data are produced using petrophysical relations that link porosity and water saturations. With the reservoir model transformed into resistivity, EM fields, such as $E_z$ data, are calculated using Finite Difference methods. Other numerical methods or integral equation methods may also be used to generate the EM field data. In such a way, the EM field data that correspond to the respective models are generated. This association is used to automatically train the CNN.

Modeled SBEM data 1902, 1904, 1906, 1907, and 1908 in the form of signal frequency, receiver (that is, sensor) depth, surface electric source radial offset, surface electrode azimuth offset, and EM component and polarization, respectively, are used to form an EM data hypercube 1910. A reservoir model 1912 is combined with the EM data hypercube 1910, which is then fed into a DLS 1914. The reservoir model 1912 is used to simulate fluid movement in a reservoir and is generally used to optimize production and injection. A feature extraction and classification module 1916, a CNN module 1918, and a prediction module 1920 are fed into the DLS 1914. Together, these modules cooperate with the DLS 1914 to extract and classify features of simulated data from the combined reservoir model 1912 and EM data hypercube 1910. The extracted features are convolved with each other to find relationships and patterns and, ultimately, to predict specific model distributions, with a specific certainty, that correlate to those patterns found in the data. Another instance of the EM data hypercube 1922 is used to perform these operations. The hypercube 1922 may be constructed from measured data. The hypercube 1910 is used to train the CNN to build corresponding regressions between reservoir simulator models and data. These relations form a DLS, such as DLS 1914, and are applied to real data, such as hypercube 1922, to predict reservoir parameters, which include a waterfront position. The DLS 1914 outputs a waterfront position reconstruction 1924. At 1926, a decision is made by an alarm system 1928 as to whether the determined waterfront position has reached a predetermined position relative to a well. If so, an alarm is triggered. The alarm system 1928 corresponds to the alarm and control system 110 of FIG. 1. The alarm and control system 1928 may be part of a larger field-wide waterfront surveillance system 1930 that may be used to monitor each production well of a reservoir during a waterflooding operation.

A field-wide distribution of wells continuously monitored with the described technology allows the automatic surveillance of the waterfront position to optimize oil production operations. The automated surveillance system is operable to infer the actual water-oil saturations in addition to the estimates of the waterfront position.

Figure 20:
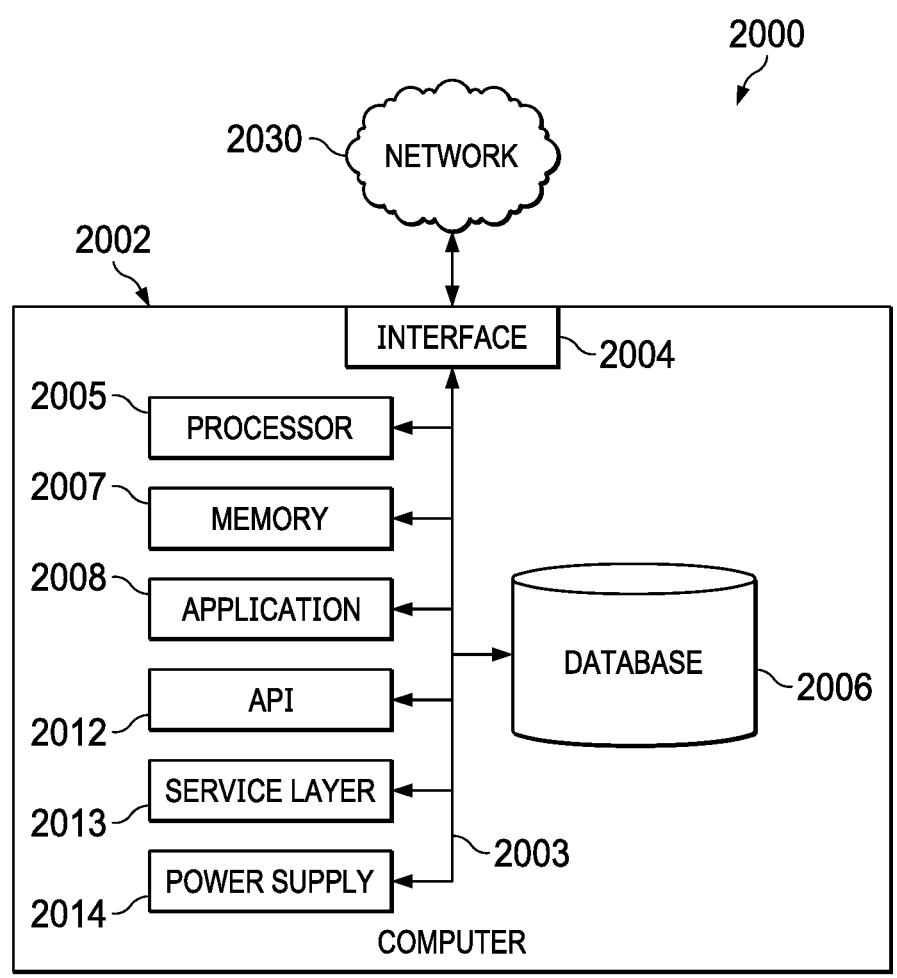
FIG. 20 is a block diagram illustrating an example computer system used to provide computational functionalities associated with described algorithms, methods, functions, processes, flows, and procedures as described in the present disclosure, according to some implementations of the present disclosure.

FIG. 20 is a block diagram of an example computer system 2000 used to provide computational functionalities associated with described algorithms, methods, functions, processes, flows, and procedures described in the present disclosure, according to some implementations of the present disclosure. The illustrated computer 2002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 2002 can include input devices such as keypads, keyboards, and touch screens that can accept user information. Also, the computer 2002 can include output devices that can convey information associated with the operation of the computer 2002. The information can include digital data, visual data, audio information, or a combination of information. The information can be presented in a graphical user interface (UI) (or GUI).

The computer 2002 can serve in a role as a client, a network component, a server, a database, a persistency, or components of a computer system for performing the subject matter described in the present disclosure. The illustrated computer 2002 is communicably coupled with a network 2030. In some implementations, one or more components of the computer 2002 can be configured to operate within different environments, including cloud-computing-based environments, local environments, global environments, and combinations of environments.

At a high level, the computer 2002 is an electronic computing device operable to receive, transmit, process, store, and manage data and information associated with the described subject matter. According to some implementations, the computer 2002 can also include, or be communicably coupled with, an application server, an email server, a web server, a caching server, a streaming data server, or a combination of servers.

The computer 2002 can receive requests over network 2030 from a client application (for example, executing on another computer 2002). The computer 2002 can respond to the received requests by processing the received requests using software applications. Requests can also be sent to the computer 2002 from internal users (for example, from a command console), external (or third) parties, automated applications, entities, individuals, systems, and computers.

Each of the components of the computer 2002 can communicate using a system bus 2003. In some implementations, any or all of the components of the computer 2002, including hardware or software components, can interface with each other or the interface 2004 (or a combination of both), over the system bus 2003. Interfaces can use an application programming interface (API) 2012, a service layer 2013, or a combination of the API 2012 and service layer 2013. The API 2012 can include specifications for routines, data structures, and object classes. The API 2012 can be either computer-language independent or dependent. The API 2012 can refer to a complete interface, a single function, or a set of APIs.

The service layer 2013 can provide software services to the computer 2002 and other components (whether illustrated or not) that are communicably coupled to the computer 2002. The functionality of the computer 2002 can be accessible for all service consumers using this service layer. Software services, such as those provided by the service layer 2013, can provide reusable, defined functionalities through a defined interface. For example, the interface can be software written in JAVA, C++, or a language providing data in extensible markup language ( XML) format. While illustrated as an integrated component of the computer 2002, in alternative implementations, the API 2012 or the service layer 2013 can be stand-alone components in relation to other components of the computer 2002 and other components communicably coupled to the computer 2002. Moreover, any or all parts of the API 2012 or the service layer 2013 can be implemented as child or sub-modules of another software module, enterprise application, or hardware module without departing from the scope of the present disclosure.

The computer 2002 includes an interface 2004. Although illustrated as a single interface 2004 in FIG. 20, two or more interfaces 2004 can be used according to particular needs, desires, or particular implementations of the computer 2002 and the described functionality. The interface 2004 can be used by the computer 2002 for communicating with other systems that are connected to the network 2030 (whether illustrated or not) in a distributed environment. Generally, the interface 2004 can include, or be implemented using, logic encoded in software or hardware (or a combination of software and hardware) operable to communicate with the network 2030. More specifically, the interface 2004 can include software supporting one or more communication protocols associated with communications. As such, the network 2030 or the interface's hardware can be operable to communicate physical signals within and outside of the illustrated computer 2002.

The computer 2002 includes a processor 2005. Although illustrated as a single processor 2005 in FIG. 20, two or more processors 2005 can be used according to particular needs, desires, or particular implementations of the computer 2002 and the described functionality. Generally, the processor 2005 can execute instructions and can manipulate data to perform the operations of the computer 2002, including operations using algorithms, methods, functions, processes, flows, and procedures as described in the present disclosure.

The computer 2002 also includes a database 2006 that can hold data for the computer 2002 and other components connected to the network 2030 (whether illustrated or not). For example, database 2006 can be an in-memory, conventional, or a database storing data consistent with the present disclosure. In some implementations, database 2006 can be a combination of two or more different database types (for example, hybrid in-memory and conventional databases) according to particular needs, desires, or particular implementations of the computer 2002 and the described functionality. Although illustrated as a single database 2006 in FIG. 20, two or more databases (of the same, different, or combination of types) can be used according to particular needs, desires, or particular implementations of the computer 2002 and the described functionality. While database 2006 is illustrated as an internal component of the computer 2002, in alternative implementations, database 2006 can be external to the computer 2002.

The computer 2002 also includes a memory 2007 that can hold data for the computer 2002 or a combination of components connected to the network 2030 (whether illustrated or not). Memory 2007 can store any data consistent with the present disclosure. In some implementations, memory 2007 can be a combination of two or more different types of memory (for example, a combination of semiconductor and magnetic storage) according to particular needs, desires, or particular implementations of the computer 2002 and the described functionality. Although illustrated as a single memory 2007 in FIG. 20, two or more memories 2007 (of the same, different, or combination of types) can be used according to particular needs, desires, or particular implementations of the computer 2002 and the described functionality. While memory 2007 is illustrated as an internal component of the computer 2002, in alternative implementations, memory 2007 can be external to the computer 2002.

The application 2008 can be an algorithmic software engine providing functionality according to particular needs, desires, or particular implementations of the computer 2002 and the described functionality. For example, application 2008 can serve as one or more components, modules, or applications. Further, although illustrated as a single application 2008, the application 2008 can be implemented as multiple applications 2008 on the computer 2002. In addition, although illustrated as internal to the computer 2002, in alternative implementations, the application 2008 can be external to the computer 2002.

The computer 2002 can also include a power supply 2014. The power supply 2014 can include a rechargeable or non-rechargeable battery that can be configured to be either user- or non-user-replaceable. In some implementations, the power supply 2014 can include power-conversion and management circuits, including recharging, standby, and power management functionalities. In some implementations, the power-supply 2014 can include a power plug to allow the computer 2002 to be plugged into a wall socket or a power source to, for example, power the computer 2002 or recharge a rechargeable battery.

There can be any number of computers 2002 associated with, or external to, a computer system containing computer 2002, with each computer 2002 communicating over network 2030. Further, the terms "client," "user," and other appropriate terminology can be used interchangeably, as appropriate, without departing from the scope of the present disclosure. Moreover, the present disclosure contemplates that many users can use one computer 2002 and one user can use multiple computers 2002.

Described implementations of the subject matter can include one or more features, alone or in combination For example, in a first implementation, a computer-implemented method of predicting movement of a waterfront within a reservoir during waterflooding of the reservoir including: generating a plurality of electrical signals with a surface electric source, each of the signals having a different corresponding frequency; injecting currents corresponding to the plurality of generated signals into the earth within a predefined distance from a well extending into the reservoir with a surface dipole; detecting vertical components of electric fields generated by the injected currents at locations in the reservoir, the vertical components of the electric fields corresponding to bulk formation resistivity changes present in the reservoir that represent the waterfront; detecting a location of the waterfront within the reservoir based on the received vertical components of the electric fields; and analyzing the detected vertical components of the electric fields taken on at least two different points in time using machine learning to predict a rate of movement of the waterfront within the reservoir.

The foregoing and other described implementations can each, optionally, include one or more of the following features:

A first feature, combinable with any of the following features, in which injecting currents corresponding to the plurality of generated signals into the earth near a well extending into the reservoir with a surface dipole includes injecting currents into the earth with a plurality of dipoles forming a surface-to-borehole acquisition system.

A second feature, combinable with any of the previous or following features, further including arranging the detected vertical components of the electric fields in an EM data hypercube, the detected vertical components of the electric fields being arranged in the hypercube based on a position of the waterfront relative to the well, the frequency of the corresponding generated electrical signal, a position of a sensor that detects the vertical components of the electric fields in the reservoir, and a radial offset of a shallow surface electrode forming an electrode of the surface dipole.

A third feature, combinable with any of the previous or following features, in which analyzing the detected vertical components of the electric fields taken on at least two different points in time with machine learning to predict a rate of movement of the waterfront within the reservoir includes: converting the detected vertical components of the electric fields into resistivity values; generating a separate reservoir model for each point in time with the converted resistivity values; and applying the deep learning system to the separate reservoir models and the EM data hypercubes, which form a machine learning knowledge-base.

A fourth feature, combinable with any of the previous or following features, in which applying the deep learning system to the separate reservoir models and the EM data hypercubes includes performing a series of regressions between the reservoir models and EM data hypercubes to predict the rate of movement of the waterfront within the reservoir.

A fifth feature, combinable with any of the previous or following features, in which injecting currents corresponding to the plurality of generated signals into the earth near a well extending into the reservoir with a surface dipole includes injecting currents having a frequency in the range of 1 Hz to 1000 Hz.

A sixth feature, combinable with any of the previous or following features, in which a dipole moment of the surface dipole is approximately 20,000 A·m.

In a second implementation, a non-transitory, computer-readable medium storing one or more instructions executable by a computer system to perform operations including: generating a plurality of electrical signals with a surface electrical source, each of the signals having a different corresponding frequency; injecting currents corresponding to the plurality of generated signals into the earth within a predefined distance from a well extending into the reservoir with a surface dipole; detecting vertical components of electric fields generated by the injected currents at locations in the reservoir, the vertical components of the electric fields corresponding to bulk formation resistivity changes present in the reservoir that represent the waterfront; detecting a location of the waterfront within the reservoir based on the received vertical components of the electric fields; and analyzing the detected vertical components of the electric fields taken on at least two different points in time using machine learning to predict a rate of movement of the waterfront within the reservoir.

The foregoing and other described implementations can each, optionally, include one or more of the following features:

A first feature, combinable with any of the following features, in which injecting currents corresponding to the plurality of generated signals into the earth near a well extending into the reservoir with a surface dipole includes injecting currents into the earth with a plurality of dipoles forming a surface-to-borehole acquisition system.

A second feature, combinable with any of the previous or following features, in which the computer readable instructions are operable to cause the one or more processors to arrange the detected vertical components of the electric fields in an EM data hypercube, in which the detected vertical components of the electric fields are arranged in the hypercube based on a position of the waterfront relative to the well, the frequency of the corresponding generated electrical signal, a position of a sensor that detects the vertical components of the electric fields in the reservoir, and a radial offset of a shallow surface electrode forming an electrode of the surface dipole.

A third feature, combinable with any of the previous or following features, in which analyzing the detected vertical components of the electric fields taken on at least two different points in time with machine learning to predict a rate of movement of the waterfront within the reservoir includes: converting the detected vertical components of the electric fields into resistivity values; generating a separate reservoir model for each point in time with the converted resistivity values; applying the deep learning system to the separate reservoir models and the EM data hypercubes, which form a machine learning knowledge-base.

A fourth feature, combinable with any of the previous or following features, in which applying the deep learning system to the separate reservoir models and the EM data hypercubes includes performing a series of regressions between the reservoir models and EM data hypercubes to predict the rate of movement of the waterfront within the reservoir.

A fifth feature, combinable with any of the previous or following features, in which injecting currents corresponding to the plurality of generated signals into the earth near a well extending into the reservoir with a surface dipole includes injecting currents having a frequency in the range of 1 Hz to 1000 Hz.

A sixth feature, combinable with any of the previous or following features, in which a dipole moment of the surface dipole is approximately 20,000 A·m.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A method of predicting movement of a waterfront within a reservoir during waterflooding of the reservoir, the method comprising:
    generating a plurality of electrical signals with a surface electric source, each of the signals having a different corresponding frequency;
    injecting currents corresponding to the plurality of generated signals into the earth within a predefined distance from a well extending into the reservoir with a surface dipole;
    detecting vertical components of electric fields generated by the injected currents at locations in the reservoir, the vertical components of the electric fields corresponding to bulk formation resistivity changes present in the reservoir that represent the waterfront;
    detecting a location of the waterfront within the reservoir based on the received vertical components of the electric fields; and
    analyzing the detected vertical components of the electric fields taken on at least two different points in time using machine learning to predict a rate of movement of the waterfront within the reservoir, wherein the machine learning comprises a deep learning system;
    generating a separate reservoir model for each point in time with a reservoir simulator;
    converting the separate reservoir models into respective resistivity models;
    generating simulated electromagnetic (EM) responses to a simulated waterfront contained within the resistivity models through EM data modeling;
    forming EM data hypercubes with the simulated EM responses for each point in time; and
    applying the deep learning system to the separate resistivity models and the EM data hypercubes, which form a machine learning knowledge-base.

2. The method of claim 1, wherein injecting currents corresponding to the plurality of generated signals into the earth near a well extending into the reservoir with a surface dipole comprises injecting currents into the earth with a plurality of dipoles forming a surface-to-borehole acquisition system.

3. The method of claim 1, wherein applying the deep learning system to the separate reservoir models and the EM data hypercubes comprises performing a series of regressions between the reservoir models and EM data hypercubes to predict the rate of movement of the waterfront within the reservoir.

4. The method of claim 1, wherein the simulated EM responses are arranged in the EM data hypercube based on a position of the waterfront relative to the well, the frequency of the corresponding generated electrical signal, a position of a sensor that detects the vertical components of the electric fields in the reservoir, and a radial offset of a shallow surface electrode forming an electrode of the surface dipole.

5. The method of claim 1, wherein injecting currents corresponding to the plurality of generated signals into the earth near a well extending into the reservoir with a surface dipole comprises injecting currents having a frequency in the range of 1 hertz (Hz) to 1000 Hz.

6. The method of claim 1, wherein a dipole moment of the surface dipole is approximately 20,000 Ampere-meter (A·m).

7. The method of claim 1, wherein analyzing the detected vertical components of the electric fields taken on at least two different points in time using machine learning to predict a rate of movement of the waterfront within the reservoir comprises predicting the rate of movement of the waterfront within the reservoir without an inversion.

8. A real-time monitoring system to detect and spatially-position a waterfront in a reservoir comprising:
a surface-to-borehole electromagnetic ("SBEM") acquisition system comprising a plurality of electric dipoles formed on the surface, the SBEM acquisition system operable to inject currents having different frequencies into the earth and measure the resulting vertical electrical fields associated with the different frequency currents;
a data processing system operable to process the received measured vertical electric fields to enhance a signal-to-noise ratio of the measured vertical electric fields;
a machine learning data analysis system operable to detect patterns within the measured vertical electric fields and predict movement of the waterfront within the reservoir comprises a deep learning system operable to receive:
the measured vertical electric field measurements taken at different points in time, the vertical electric field measurements arranged in an EM data hypercube for point in time, and
a reservoir model for each point in time, and
wherein the machine learning data analysis system is operable to predict movement of the waterfront in the reservoir based on predicted patterns using regressions between the reservoir models and the EM data hypercubes; and
an alarm and control system operable to signal an alarm when a position of the waterfront is predicted to be a predetermined distance from the well.

9. The real-time monitoring system of claim 8, wherein the SBEM acquisition system comprises:
a plurality of radials, wherein each radial comprises a plurality of shallow borehole electrodes spaced apart along the radial and wherein each of the shallow borehole electrodes forms a first dipole electrode;
a well casing forming a second dipole electrode; and
a surface electric source associated with each of the plurality of radials, each of the surface electric sources operable to generate the electrical signals to create the currents having different frequencies,
wherein each surface electric source is coupled to the well casing and is selectively coupled to one of the shallow borehole electrodes disposed along the radial associated with the surface electric source.

10. The real-time monitoring system of claim 8, wherein the SBEM acquisition system further comprises a plurality of sensors disposed along a length of the well extending through the reservoir, each of the plurality of sensors operable to detect a vertical electric field corresponding to the injected currents.

11. The real-time monitoring system of claim 8, wherein the SBEM acquisition system is operable to inject currents having frequencies within a range of 1 Hz to 1,000 Hz.

12. The real-time monitoring system of claim 8, wherein a dipole moment of the plurality of electric dipole is approximately 20,000 A·m.

13. The real-time monitoring system of claim 8, wherein the machine learning data system is operable to generate a reservoir model that includes a position of the waterfront in the reservoir.

14. A computer program product encoded on a non-transitory medium, the product comprising computer readable instructions for causing one or more processors to perform operations comprising:
generating a plurality of electrical signals with a surface electrical source, each of the signals having a different corresponding frequency;
injecting currents corresponding to the plurality of generated signals into the earth within a predefined distance from a well extending into the reservoir with a surface dipole;
detecting vertical components of electric fields generated by the injected currents at locations in the reservoir, the vertical components of the electric fields corresponding to bulk formation resistivity changes present in the reservoir that represent the waterfront;
detecting a location of the waterfront within the reservoir based on the received vertical components of the electric fields; and
analyzing the detected vertical components of the electric fields taken on at least two different points in time using machine learning to predict a rate of movement of the waterfront within the reservoir, wherein the machine learning comprises a deep learning system;
generating a separate reservoir model for each point in time with a reservoir simulator;
converting the separate reservoir models into respective resistivity models;
generating simulated electromagnetic (EM) responses to a simulated waterfront contained within the resistivity models through EM data modeling;
forming EM data hypercubes with the simulated EM responses for each point in time; and
applying the deep learning system to the separate resistivity models and the EM data hypercubes, which form a machine learning knowledge-base.

15. The computer program product encoded on a non-transitory medium of claim 14, wherein injecting currents corresponding to the plurality of generated signals into the earth near a well extending into the reservoir with a surface dipole comprises injecting currents into the earth with a plurality of dipoles forming a surface-to-borehole acquisition system.

16. The computer program product encoded on a non-transitory medium of claim 14, wherein applying the deep learning system to the separate reservoir models and the EM data hypercubes comprises performing a series of regressions between the reservoir models and EM data hypercubes to predict the rate of movement of the waterfront within the reservoir.

17. The computer program product encoded on a non-transitory medium of claim 14, wherein the simulated EM responses are arranged in the EM data hypercube based on a position of the waterfront relative to the well, the frequency of the corresponding generated electrical signal, a position of a sensor that detects the vertical components of the electric fields in the reservoir, and a radial offset of a shallow surface electrode forming an electrode of the surface dipole.

18. The computer program product encoded on a non-transitory medium of claim 14, wherein injecting currents corresponding to the plurality of generated signals into the earth near a well extending into the reservoir with a surface dipole comprises injecting currents having a frequency in the range of 1 Hz to 1000 Hz.

19. The computer program product encoded on a non-transitory medium of claim 14, wherein a dipole moment of the surface dipole is approximately 20,000 A·m.

* * * * *